(12) United States Patent
Oda

(10) Patent No.: US 9,678,597 B2
(45) Date of Patent: Jun. 13, 2017

(54) SIGNAL PROCESSING CIRCUIT, SIGNAL PROCESSING METHOD, POSITION DETECTOR, AND ELECTRONIC DEVICE FOR POSITION DETECTION SENSOR INCLUDING SENSOR SELF-CAPACITANCE CORRECTION

(71) Applicant: Wacom Co., Ltd., Saitama (JP)

(72) Inventor: Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 84 days.

(21) Appl. No.: 14/520,263

(22) Filed: Oct. 21, 2014

(65) Prior Publication Data

US 2015/0242043 A1 Aug. 27, 2015

(30) Foreign Application Priority Data

Feb. 21, 2014 (JP) .................. 2014-031195

(51) Int. Cl.
*G09G 3/34* (2006.01)
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ... G09F 2203/04107; G09F 2203/0339; G09F 2203/04103–2203/04112; G06F 3/041–3/0416; G06F 3/0488–3/04886; G06F 1/1643; G06F 1/169
See application file for complete search history.

(56) References Cited

U.S. PATENT DOCUMENTS

| 8,487,891 B2 | 7/2013 | Oda et al. |
| 8,581,861 B2 | 11/2013 | Oda et al. |
| 8,587,534 B2 | 11/2013 | Oda et al. |

(Continued)

FOREIGN PATENT DOCUMENTS

| JP | 2011003035 A | 1/2011 |
| JP | 2011003036 A | 1/2011 |

(Continued)

OTHER PUBLICATIONS

Extended European Search Report dated Jul. 9, 2015, for corresponding EP Application No. 14191646.0-1972, 9 pages.

*Primary Examiner* — Sanghyuk Park
(74) *Attorney, Agent, or Firm* — Seed Intellectual Property Law Group LLP

(57) ABSTRACT

A signal processing circuit is connected to one of a plurality of conductors of a position detection sensor having a self-capacitance and configured to generate a signal indicative of the self-capacitance for use in correcting a pointer position detection signal. The circuit includes a capacitor circuit and detects a change in capacitance between the conductor and a pointer (e.g., a finger) as a change in voltage in the capacitor circuit. The signal processing circuit further includes: a gate circuit which controls the connection between the capacitor circuit and the conductor; and a voltage supply control circuit which temporarily sets, to a defined voltage level, a first end of the gate circuit to which the conductor is connected and sets a defined potential difference between the first end and another (second) end of the gate circuit to which the capacitor circuit is connected.

18 Claims, 18 Drawing Sheets

(56) References Cited

U.S. PATENT DOCUMENTS

| | | | |
|---|---|---|---|
| 8,587,535 | B2 | 11/2013 | Oda et al. |
| 8,692,779 | B2 | 4/2014 | Oda et al. |
| 2010/0245286 | A1 | 9/2010 | Parker |
| 2010/0321313 | A1 | 12/2010 | Oda et al. |
| 2010/0321314 | A1 | 12/2010 | Oda et al. |
| 2010/0321315 | A1 | 12/2010 | Oda et al. |
| 2010/0321331 | A1 | 12/2010 | Oda et al. |
| 2010/0321332 | A1 | 12/2010 | Oda et al. |
| 2010/0321333 | A1 | 12/2010 | Oda et al. |
| 2010/0321334 | A1 | 12/2010 | Oda et al. |
| 2012/0146940 | A1 | 6/2012 | Yamamoto et al. |
| 2012/0182028 | A1* | 7/2012 | Oya .................... G06F 3/0416 324/684 |
| 2013/0307811 | A1 | 11/2013 | Hanssen et al. |
| 2014/0009430 | A1* | 1/2014 | Italia .................... G06F 3/044 345/174 |
| 2014/0098039 | A1 | 4/2014 | Oda |

FOREIGN PATENT DOCUMENTS

| | | | |
|---|---|---|---|
| JP | 2011243081 | A | 12/2011 |
| JP | 2012123599 | A | 6/2012 |
| JP | 2014075051 | A | 4/2014 |

* cited by examiner

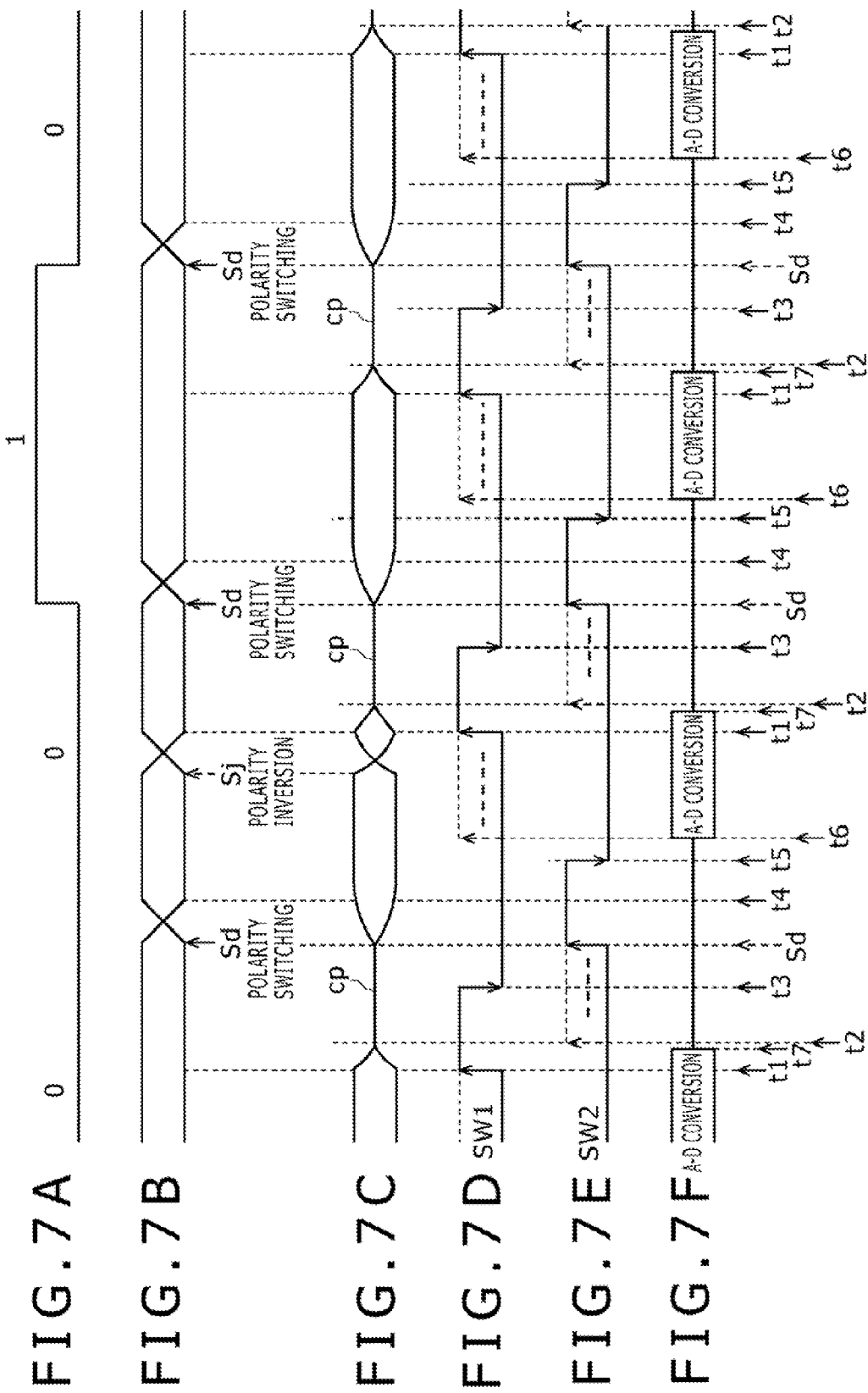

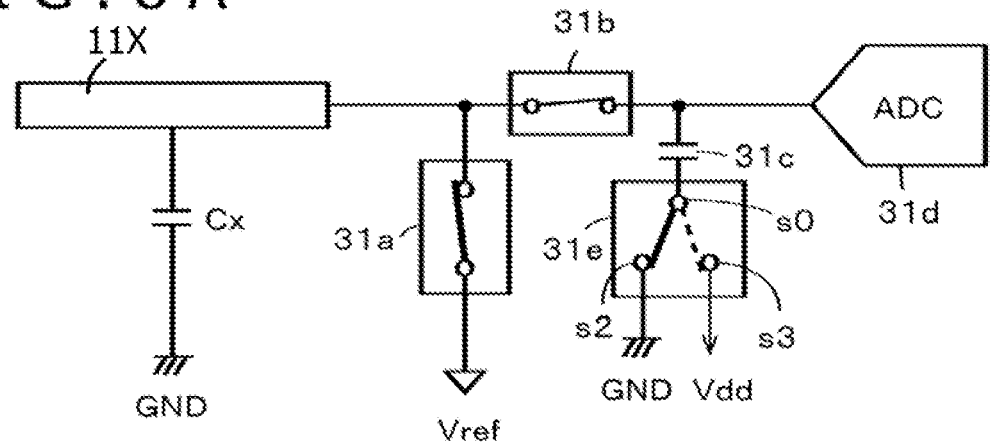
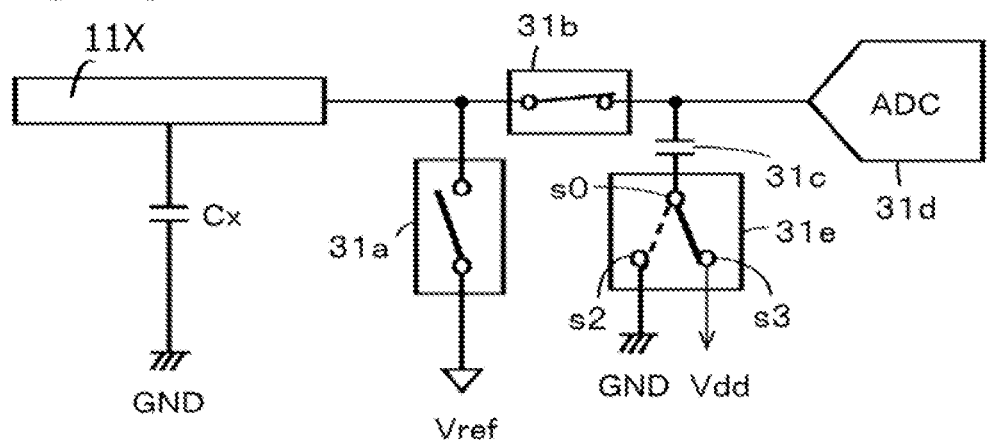
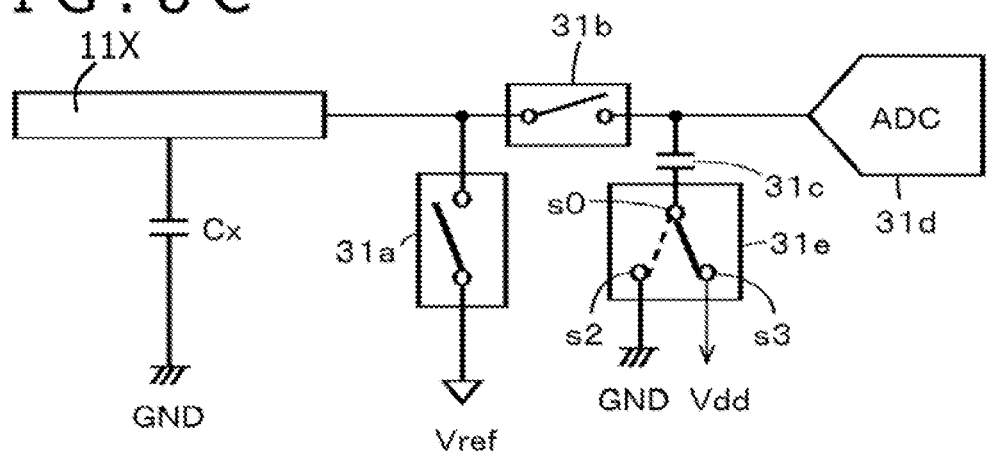

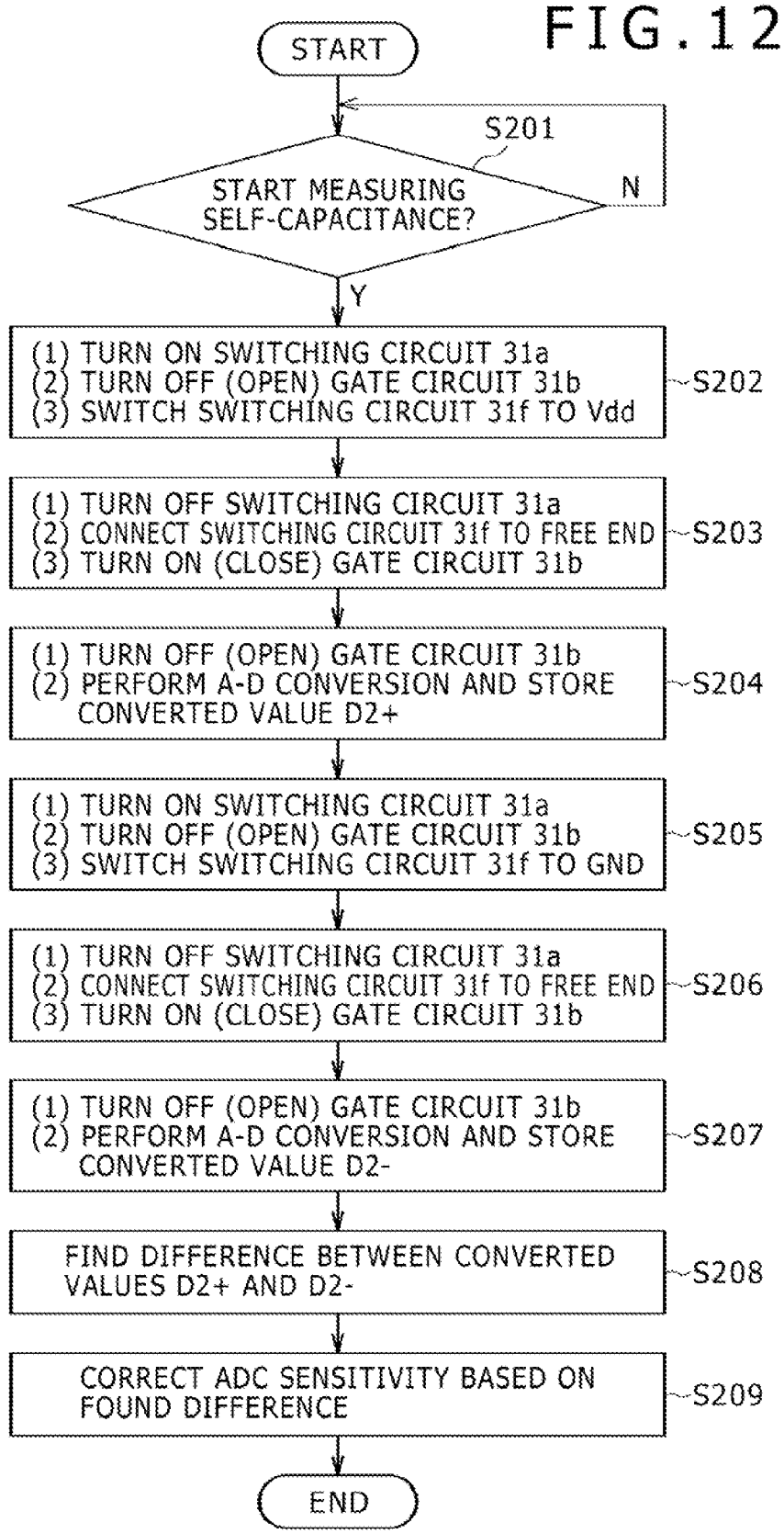

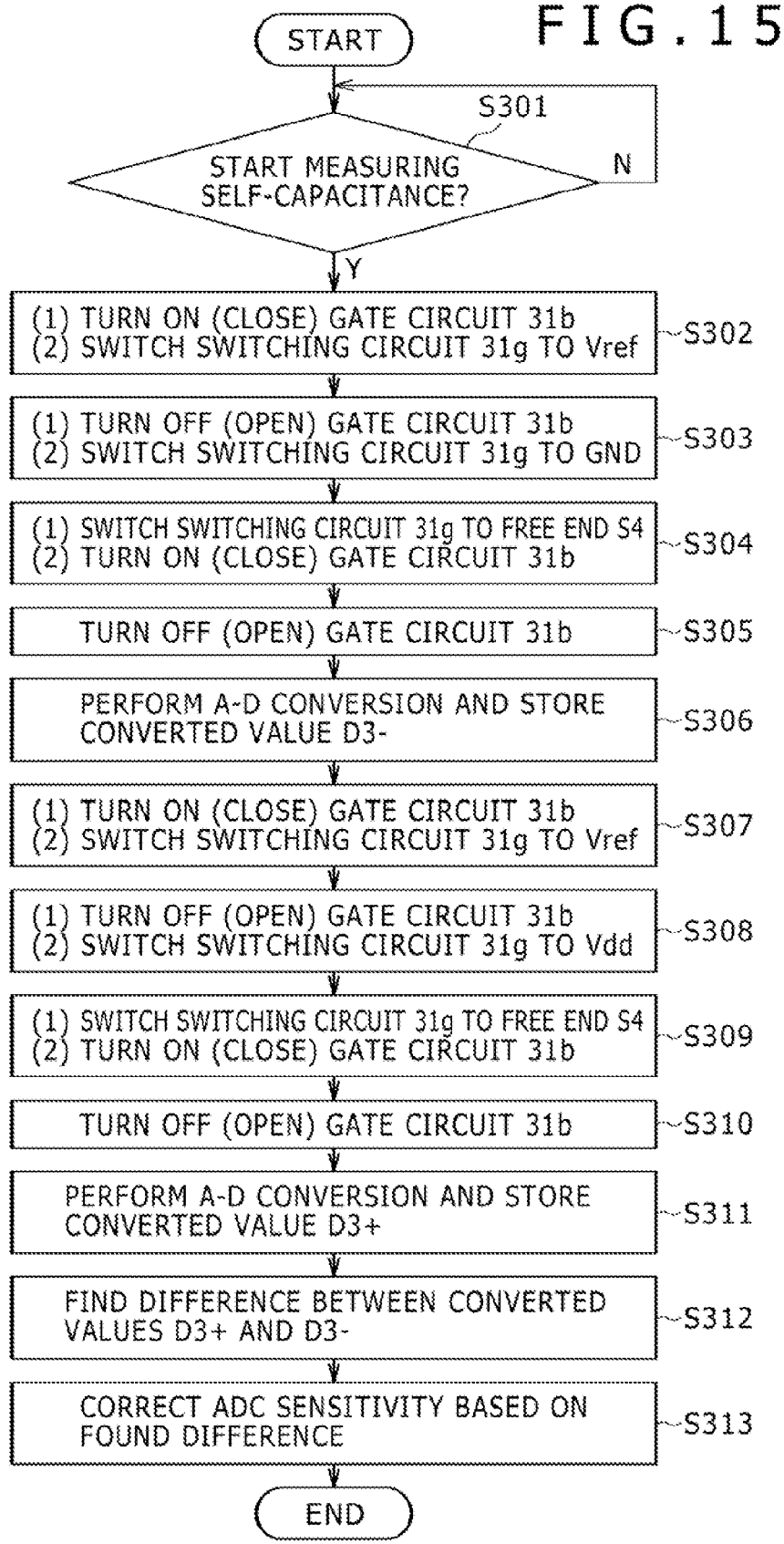

FIG.17

$$V_{co}(Be) = V_{ref} \quad \cdots\cdots(\text{FORMULA 1})$$

$$V_{co}(Af) = \frac{(V_{ref}+V_{dd}) \cdot C_o + V_{ref} \cdot C_x}{C_o + C_x}$$

WHERE $C_o$ IS THE INTERNAL CAPACITANCE (INCLUDING STRAY CAPACITANCE) OF THE CAPACITOR CIRCUIT 31c $$\cdots\cdots(\text{FORMULA 2})$$

$$\begin{aligned}\Delta V &= V_{co}(Af) - V_{co}(Be) \\ &= \frac{(V_{ref}+V_{dd}) \cdot C_o + V_{ref} \cdot C_x}{C_o + C_x} - \frac{(V_{ref} \cdot C_o) + V_{ref} \cdot C_x}{C_o + C_x} \\ &= \frac{C_o}{C_o + C_x} \cdot V_{dd} \quad \cdots\cdots(\text{FORMULA 3})\end{aligned}$$

$$C_x = \left(\frac{V_{dd} - \Delta V}{\Delta V}\right) \cdot C_o \quad \cdots\cdots(\text{FORMULA 4})$$

SENSITIVITY CHANGE:

$$\frac{C_x(Ini) + C_o}{C_x + C_o} = \frac{\frac{V_{dd} - \Delta V(Ini)}{\Delta V(Ini)} + 1}{\frac{V_{dd} - \Delta V}{\Delta V} + 1} = \frac{\Delta V}{\Delta V(Ini)} \quad \cdots\cdots(\text{FORMULA 5})$$

SENSITIVITY CORRECTION:

$$ADC(Af) = \frac{\Delta V(Ini)}{\Delta V} \cdot ADC(Be) \quad \cdots\cdots(\text{FORMULA 6})$$

FIG.18

$$V_{co}(Be) = V_{dd} \quad \cdots\cdots(\text{FORMULA 7})$$

$$V_{co}(Af) = \frac{V_{dd} \cdot C_o + V_{ref} \cdot C_x}{C_o + C_x} \quad \cdots\cdots(\text{FORMULA 8})$$

$$\Delta V = V_{co}(Af) - V_{co}(Be)$$

$$= V_{dd} - \frac{V_{dd} \cdot C_o + V_{ref} \cdot C_x}{C_o + C_x}$$

$$= \frac{C_o}{C_o + C_x}(V_{dd} - V_{ref}) \quad \cdots\cdots(\text{FORMULA 9})$$

$$C_x = \frac{\Delta V}{V_{dd} - V_{ref} - \Delta V} \cdot C_o \quad \cdots\cdots(\text{FORMULA 10})$$

SENSITIVITY CHANGE:

$$\frac{C_x(Ini) + C_o}{C_x + C_o} = \frac{\dfrac{\Delta V(Ini) + C_o}{V_{dd} - V_{ref} - \Delta V(Ini)}}{\dfrac{\Delta V + C_o}{V_{dd} - V_{ref} - \Delta V} + 1}$$

$$= \frac{\dfrac{V_{dd} - V_{ref}}{V_{dd} - V_{ref} - \Delta V(Ini)} + 1}{\dfrac{V_{dd} - V_{ref}}{V_{dd} - V_{ref} - \Delta V}}$$

$$= \frac{V_{dd} - V_{ref} - \Delta V}{V_{dd} - V_{ref} - \Delta V(Ini)} \quad \cdots\cdots(\text{FORMULA 11})$$

SENSITIVITY CORRECTION:

$$ADC(Af) = \frac{V_{dd} - V_{ref} - \Delta V(Ini)}{V_{dd} - V_{ref} - \Delta V} \cdot ADC(Be)$$

$$\cdots\cdots(\text{FORMULA 12})$$

SIGNAL PROCESSING CIRCUIT, SIGNAL PROCESSING METHOD, POSITION DETECTOR, AND ELECTRONIC DEVICE FOR POSITION DETECTION SENSOR INCLUDING SENSOR SELF-CAPACITANCE CORRECTION

BACKGROUND OF THE INVENTION

1. Field of the Invention

The present disclosure relates to a signal processing circuit and a signal processing method suitable for use with capacitive position detection sensors capable of detecting positions pointed to by a plurality of pointers such as active capacitive pens, and to a position detector and an electronic device having the same.

2. Description of the Related Art

Position detectors such as touch panel have come into wide use, prompting various inventions relating to position detectors to be developed. For example, Patent Document 1 (Japanese Patent Application Laid-Open Publication No. 2011-243081) includes a disclosure relating to a capacitive touch panel device. In the case of a position detector disclosed in Patent Document 1, a panel main body 4 (position detection sensor) is formed by arranging a plurality of transmitting electrodes (transmitting conductors) 2 and a plurality of receiving electrodes (receiving conductors) 3 in a grid pattern so as to supply a given signal to the transmitting electrodes 2. At a position pointed to by a finger serving as a pointer, a current (charge) is divided via the finger, thus changing a capacitance (mutual capacitance) formed between the transmitting electrode 2 and the receiving electrode 3. The change in current through the receiving electrode 3 based on this change in capacitance is measured.

Therefore, it is possible to detect the position of the panel main body 4 pointed to by the pointer by detecting the change in current based on the change in mutual capacitance at each of the intersections between the transmitting electrodes 2 and the receiving electrodes 3.

However, the current that changes in the receiving electrode 3 at a position pointed to by a pointer such as a finger is extremely weak. Therefore, such an extremely weak current is converted to a voltage or current of an appropriate signal level for processing. The above Patent Document 1 describes the conversion of an extremely weak current flowing through the receiving electrode 3 to a voltage with an IV conversion section (current-voltage or charge-voltage conversion section) 31 that uses an op-amp (operational amplifier) OPA (FIG. 5).

Further, a position pointer called active capacitive pen is known as a pointer. Among known types of active capacitive pens are that which includes a transmitter and supplies a transmission signal to a position detector and that which receives a signal from a position detector, amplifies the received signal, and supplies the amplified signal to the position detector. The position detector is designed to receive a signal from the active capacitive pen with a sensor electrode (conductor) through electric field coupling and make a determination of the received signal for each electrode (conductor), thus detecting the position pointed to by the active capacitive pen.

A touch panel device including an IV conversion section as disclosed in the above Patent Document 1 is not suitable for use with mobile devices called smartphones that have quickly become pervasive in recent years. A smartphone includes, for example, a display screen of about four inches and detects a position pointed to by a pointer, such as pen or a finger of a user, through a touch panel device (position detector) arranged on the display screen. A smartphone faces demands for lower power consumption, downsizing, and reduction in weight as a mobile device.

However, the IV conversion section, which commonly includes a capacitor and a resistor between the input and output of the op-amp as illustrated in FIG. 5 of the above Patent Document 1, consumes a lot of power because the op-amp is used to convert a current to a voltage. Further, the IV conversion section requires a capacitor having a relatively large capacitance. In order to form a capacitor using a semiconductor process during integration of the IV conversion section into an IC chip, a semiconductor area over which the capacitor is formed is considerably larger than those of other circuit elements, making it difficult to integrate the IV conversion section into an IC chip.

In the touch panel device described in the Patent Document 1, a plurality of receiving electrodes share the single IV conversion section 31. One of the plurality of receiving electrodes is connected to the single IV conversion section 31 via a switching circuit 21 for current-to-voltage conversion.

However, if the plurality of receiving electrodes share the single IV conversion section 31, a pointed position may not be detected in a timely manner depending on the relationship between the processing speed for switching the plurality of receiving electrodes (receiving conductors) from one to another for connection to the IV conversion section 31 and current-to-voltage conversion and the speed at which the pointer moves on the touch panel. In this case, the detection of a position pointed to by the pointer at an appropriate time may be overlooked.

To improve the above problem, the present applicant proposed a signal processing circuit as Japanese Patent Application No. 2012-222472 (filed on Oct. 4, 2012). This circuit has no IV converter made up of an op-amp, a capacitor, and a resistor for current-to-voltage conversion and receives, with a capacitor circuit, the change in voltage obtained by the receiving conductors. The capacitor circuit obtains, as a voltage signal, the change in capacitance in response to pointing of a position by the pointer. The position detector using the signal processing circuit according to the previous application consumes small power and can be reduced in circuit scale, making it suitable for use with mobile devices such as smartphones.

If an extremely weak current flowing through a receiving conductor is converted to a voltage using the IV conversion section for processing as in the Patent Document 1, all the currents flowing through the receiving conductors flow into the capacitor connected between the input and output of the op-amp (capacitor in the IC). As a result, the position detection sensor including the transmitting and receiving conductors remains unaffected by the self-capacitances of the receiving conductors.

However, if the capacitor circuit obtains, as a voltage signal, the change in capacitance in response to pointing of a position by the pointer, as used in the signal processing circuit proposed in the previous application, the capacitor circuit is affected by the self-capacitances of the receiving conductors of the position detection sensor.

That is, in the case of a position detection sensor adapted to detect the change in capacitance (mutual capacitance) formed between the transmitting electrode 2 and the receiving electrode 3 as a result of division of the current (charge) via the finger as in Patent Document 1, a voltage change V taking place in the receiving conductor pointed to by the finger is proportional to $-Q/(Cx+Co)$ where $-Q$ is the charge divided via the finger, Cx is the self-capacitance of the receiving conductor, and Co is the capacitance of the capacitor circuit. As a result, the voltage change V is affected by the self-capacitance Cx of the receiving conductor.

Similarly, in the case of an active capacitive pen, the voltage change V taking place in the receiving conductor pointed to by the active capacitive pen is proportional to +Q/(Cx+Co) where +Q is the charge applied to the receiving conductor via the active capacitive pen. As a result, the voltage change V is affected by the self-capacitance Cx of the receiving conductor.

Therefore, when a pointing input is made to the position detection sensor by a pointer such as a finger (when a finger approaches (hovers over) or touches the position detection sensor), the self-capacitance of the receiving conductor of the position detection sensor increases. However, this increase in self-capacitance causes the voltage signal corresponding to a position pointed to by the pointer to diminish, thus changing a detection sensitivity of the pointer.

SUMMARY OF THE INVENTION

In light of the foregoing, it is desirable to provide a signal processing circuit that improves the problem of change in detection sensitivity of a pointer because of the effect of the self-capacitances of receiving conductors of a position detection sensor when the change in capacitance in response to a position pointed to by the pointer is obtained as a change in voltage signal.

According to an embodiment of the present disclosure, there is provided a signal processing circuit that is connected to one of a plurality of conductors of a position detection sensor having a self-capacitance. The signal processing circuit includes a capacitor circuit and detects, as a change in voltage signal taking place in the capacitor circuit, the change in capacitance taking place between the conductor and a pointer.

The signal processing circuit further includes a gate circuit and a voltage supply control circuit. The gate circuit controls the connection between the capacitor circuit and the conductor. The voltage supply control circuit temporarily sets, to a given voltage level, a first end of the gate circuit to which the conductor is connected. The voltage supply control circuit also sets a given potential difference between the first end of the gate circuit and a second end of the gate circuit to which the capacitor circuit is connected. As a result of the setting of the given voltage level and the given potential difference by the gate circuit, a voltage change is produced at the second end of the circuit. The signal processing circuit generates a signal indicative of the self-capacitance of the position detection sensor based on the voltage change produced at the second end of the gate circuit.

In the signal processing circuit configured as described above according to the embodiment of the present disclosure, the voltage supply control circuit temporarily sets, to a given voltage level, the first end of the gate circuit to which the conductor is connected and also sets a given potential difference between the first end of the gate circuit and the second end of the gate circuit to which the capacitor circuit is connected. The signal processing circuit generates a signal indicative of the self-capacitance of the position detection sensor based on a change in voltage taking place at the second end of the gate circuit, as a result of the setting of the given voltage level and the given potential difference.

That is, the change in voltage taking place at the second end of the gate circuit as a result of the setting of the given voltage level and the given potential difference includes the change in voltage of the self-capacitance of the position detection sensor. Thus, it is possible to eliminate the effect of the self-capacitances of the receiving conductors of the position detection sensor by correcting the voltage signal obtained at the second end of the gate circuit, to which the capacitor circuit is connected, during detection of a position pointed to by the pointer, by using the change in voltage at the second end of the gate circuit caused by the self-capacitance of the position detection sensor.

The present disclosure provides a signal processing circuit that improves the problem of change in detection sensitivity of a pointer because of the effect of the self-capacitances of receiving conductors of a position detection sensor when the change in capacitance corresponding to a position pointed to by the pointer is obtained as a change in voltage signal.

BRIEF DESCRIPTION OF THE DRAWINGS

FIGS. 7A to 7F are diagrams illustrating a timing chart for describing an operation of a finger touch detection circuit of the position detector according to the embodiment of the present disclosure for detecting finger touch;

FIGS. 8A to 8C are diagrams for describing an operation of major components of the signal processing circuit according to the first embodiment of the present disclosure;

FIG. 12 is a diagram illustrating a flowchart for describing an operation flow of the major components of the signal processing circuit according to the second embodiment of the present disclosure;

FIG. 15 is a diagram illustrating a flowchart for describing an operation flow of the major components of the signal processing circuit according to the third embodiment of the present disclosure;

FIG. 17 is a diagram illustrating formulas used to describe the operation of the major components of the signal processing circuit according to the first embodiment of the present disclosure; and FIG. 18 is a diagram illustrating formulas used to describe the operation of the major components of the signal processing circuit according to the second embodiment of the present disclosure.

DETAILED DESCRIPTION OF THE PREFERRED EMBODIMENTS

Description will be given below of the signal processing circuit, the signal processing method, the position detector, and the electronic device according to embodiments of the present disclosure with reference to the accompanying drawings. The signal processing circuit, the signal processing method, the position detector, and the electronic device according to the embodiments of the present disclosure are suitable for use with capacitive position detection sensors.

First Embodiment

Figure 1:
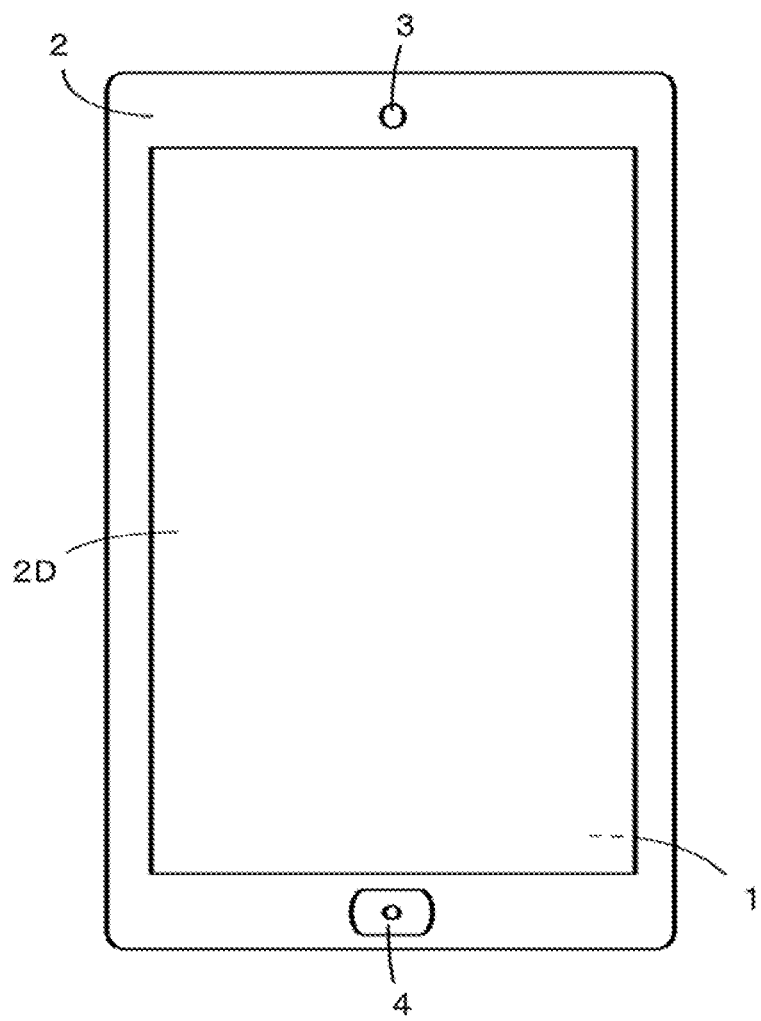
FIG. 1 is a diagram for describing an electronic device according to an embodiment of the present disclosure.

Position Detector to Which the Signal Processing Circuit and the Signal Processing Method According to an Embodiment of the Present Disclosure Are Applied FIG. 1 illustrates an example of an electronic device that includes a position detector 1. The signal processing circuit and the signal processing method according to an embodiment of the present disclosure are applied to the position detector 1. An electronic device 2 in the example shown in FIG. 1 is a mobile device called, for example, smartphone that includes a display screen 2D such as LCD (Liquid Crystal Display). A sensor section (position detector sensor) making up the position detector 1 is arranged on a front face area of the display screen 2D. Further, a receiver 3 and a transmitter 4 are provided respectively at top and bottom areas of the electronic device 2.

When a position is pointed to by a pointer such as a finger or active capacitive pen on the sensor section arranged on the front face area of the display screen 2D of the electronic device 2, the position detector 1 detects the position operated by a finger or active capacitive pen so that the microcomputer included in the electronic device 2 can perform a display process in accordance with the operated position.

That is, the electronic device 2 according to the present embodiment can not only detect position pointing operation on the sensor section with a finger (finger touch) but also pen pointing operation with an active capacitive pen adapted to transmit a transmission signal.

[Configuration Example of the Capacitive Position Detector 1]

Figure 2:
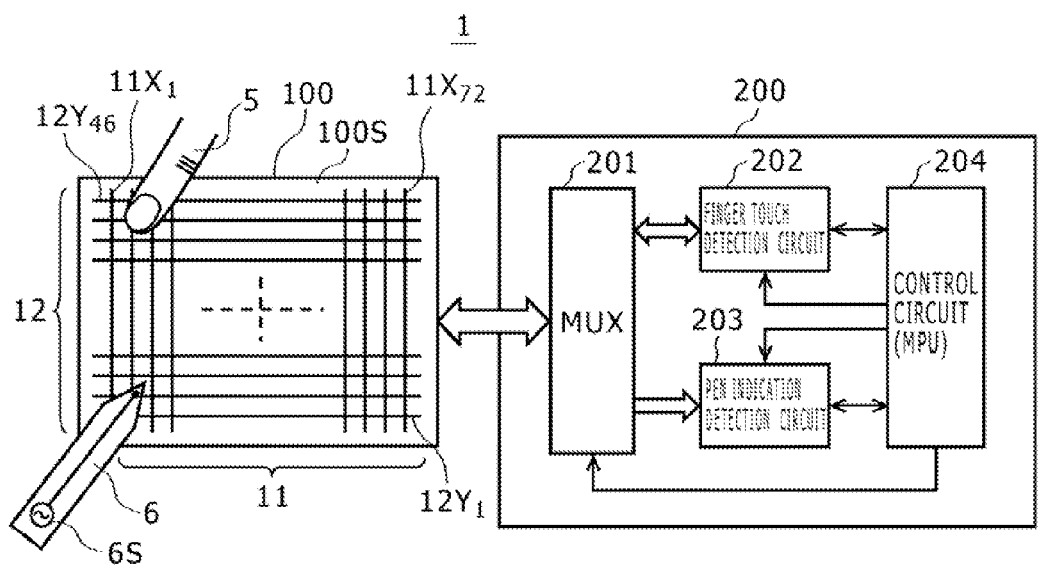
FIG. 2 is a block diagram for describing an outline of a configuration example of a position detector according to the embodiment of the present disclosure.

Description will be given next of a configuration example of the position detector 1 used, for example, in the electronic device 2 shown in FIG. 1. FIG. 2 is a diagram for describing an outline of a configuration example of the position detector 1 according to the present embodiment. The position detector 1 in this example includes a so-called cross-point (mutual capacitance) sensor section. The position detector 1 supplies transmission signals to conductors arranged in a first direction and receives signals from conductors arranged in a second direction different from the first direction when detecting a capacitive touch with a finger or other pointer, and multiple touches, in particular. Further, when the pointer is an active capacitive pen, the position detector 1 receives signals from the conductors arranged in the first and second directions. It should be noted that the principle behind a cross-point capacitive position detector is described in detail, for example, in Japanese Patent Application Laid-Open Publication Nos. 2011-3035, 2011-3036, and 2012-123599, i.e., laid-open application publications relating to the disclosure of the inventor of the present application, which are incorporated by reference herein.

The position detector 1 according to the present embodiment includes a sensor section 100 and a control device section 200 as illustrated in FIG. 2. The sensor section 100 makes up a touch panel (position detection sensor). The control device section 200 includes a multiplexer 201, a finger touch detection circuit 202, a pen pointing detection circuit 203, and a control circuit 204. The multiplexer 201 includes an input/output interface for communication with the sensor section 100.

Figure 4:
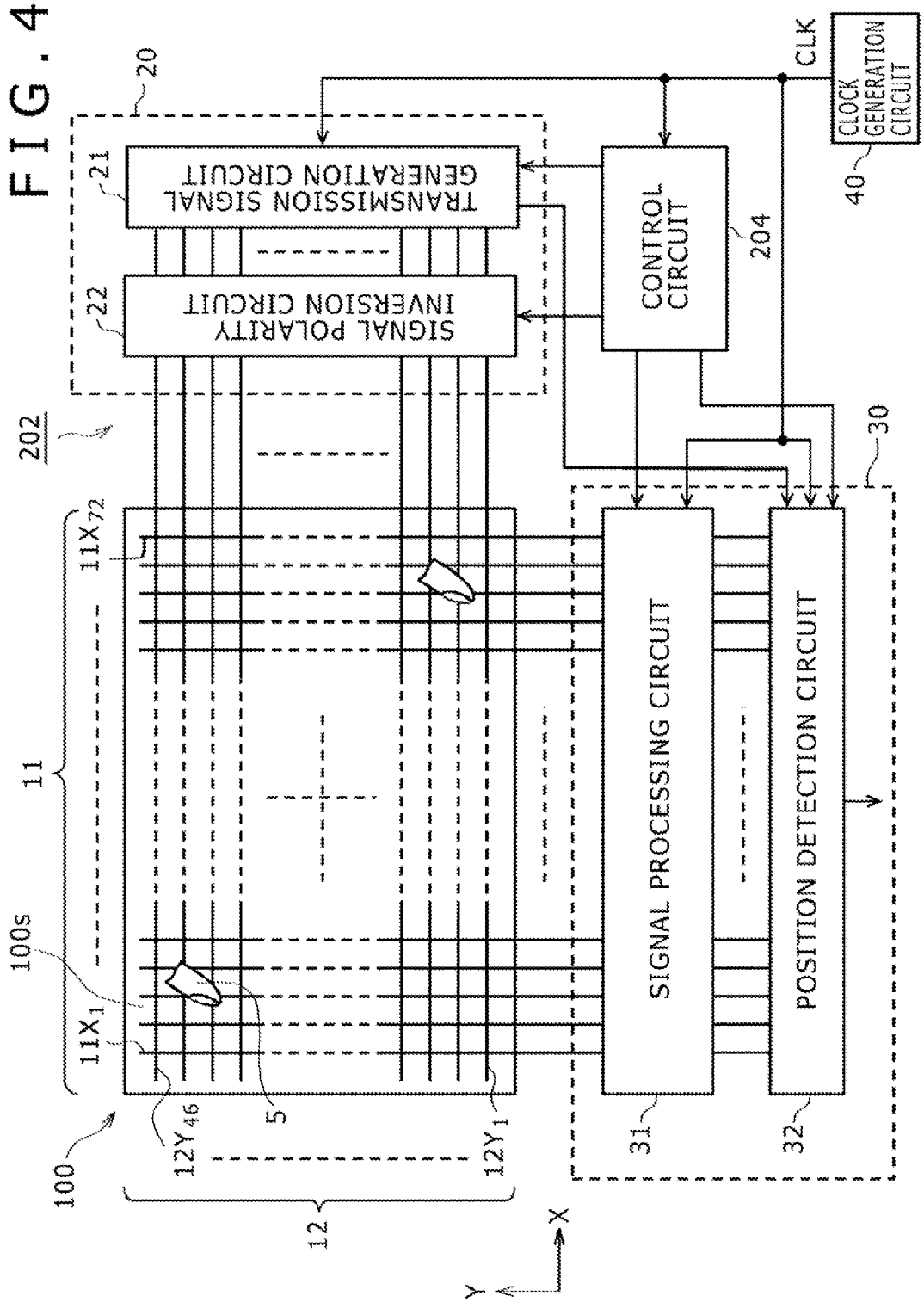
FIG. 4 is a block diagram of a finger touch detection circuit of the position detector according to the embodiment of the present disclosure.

The sensor section 100 in this example is formed by stacking, from the lower layer, a transmitting conductor group 12, an insulating layer, and a receiving conductor group 11 in this order. The transmitting conductor group 12 includes, for example, a plurality of transmitting conductors $12Y_1$, $12Y_2$ and so on up to $12Y_{46}$ that extend in the horizontal direction (x-axis direction) and are arranged in parallel with a given spacing therebetween as illustrated in FIG. 2 and FIG. 4 which will be described later. Further, the receiving conductor group 11 includes a plurality of receiving conductors $11X_1$, $11X_2$ and so on up to $11X_{72}$ that extend in a direction intersecting the transmitting conductors $12Y_1$, $12Y_2$ and so on up to $12Y_{46}$, and, in this example, in the vertical direction (y-axis direction) orthogonal to the transmitting conductors $12Y_1$, $12Y_2$ and so on up to $12Y_{46}$ and are arranged in parallel with a given spacing therebetween.

In the sensor section 100 according to the present embodiment, the plurality of receiving conductors $11X_1$, $11X_2$ and so on up to $11X_{72}$ making up the receiving conductor group 11 are first conductors, and the plurality of transmitting conductors $12Y_1$, $12Y_2$ and so on up to $12Y_{46}$ making up the transmitting conductor group 12 are second conductors. Thus, the position detector 1 detects a position pointed to by a finger 5 or an active capacitive pen 6 using a sensor pattern formed by arranging the transmitting and receiving conductors to intersect each other.

Then, the position detector 1 according to the present embodiment is incorporated in the electronic device 2 such as mobile device called smartphone described with reference to FIG. 1. Therefore, the sensor section 100 matches the size of the display screen 2D of the display device available with the electronic device 2 and forms a pointing input surface 100S of about four inches in size with the receiving conductor group 11 and the transmitting conductor group 12 that are optically transparent.

It should be noted that the receiving conductor group 11 and the transmitting conductor group 12 may be arranged on the same side of a sensor substrate. Alternatively, one of the receiving conductor group 11 and the transmitting conductor group 12 may be arranged on one side of a sensor substrate, and the other thereof on the other side of the sensor substrate.

The multiplexer 201 has a switching circuit function and connects the sensor section 100 to the finger touch detection circuit 202 or the pen pointing detection circuit 203 in accordance with switching control exercised by the control circuit 204.

The finger touch detection circuit 202 detects a touch on the sensor section 100 by the finger 5 and does so by detecting the position touched by the finger by detecting the change in capacitance because each of the intersections of the sensor pattern undergoes a change in capacitance when touched by the finger. The sensor pattern is formed by arranging the transmitting and receiving conductors to intersect each other.

That is, the finger touch detection circuit 202 supplies the transmitting conductors with a transmission signal at a frequency of, for example, 50 kHz to 200 kHz, and supplies a signal processing circuit with a reception signal from the receiving conductors. The signal processing circuit relies on the fact that the capacitance changes at a position touched by a finger and detects the position touched by a finger by detecting the change in reception signal level from the receiving conductor at that position. Then, the finger touch detection circuit 202 supplies the finger touch detection result to the control circuit 204.

The finger touch detection circuit 202 is configured by applying the signal processing circuit and the signal processing method according to an embodiment of the present disclosure. Description will be given later of a detailed configuration example of the finger touch detection circuit 202.

The pen pointing detection circuit 203 detects a position pointed to on the sensor section 100 by the active capacitive pen 6. The active capacitive pen 6 incorporates an oscillation circuit 6S and sends out a signal at a frequency of, for example, 1.8 MHz from the oscillation circuit 6S. The pen pointing detection circuit 203 receives, with the receiving conductor group 11 (first conductors) and the transmitting conductor group 12 (second conductors) of the sensor section 100, a signal from the active capacitive pen 6. Then, the pen pointing detection circuit 203 checks the level of the 1.8 MHz signal from the active capacitive pen 6 on each of the conductors making up the first and second conductors, thus detecting the position of the active capacitive pen 6 located on the receiving (first) conductor, as well as on the transmitting (second) conductor functioning as a receiving conductor, where the 1.8 MHz signal is at high level. Then, the pen pointing detection circuit 203 supplies the control circuit 204 with the detection result of the position pointed to by the active capacitive pen 6.

It should be noted that the frequency of the signal handled by the finger touch detection circuit 202 is from 50 to 200 kHz, and the frequency of the signal handled by the pen pointing detection circuit 203 is 1.8 MHz. Because the frequency ranges of the signals used by the detection circuits 202 and 203 significantly differ from each other, the signals handled by these circuits can be separated, for example, by a bandpass filter. It should be noted that the description of the pen pointing detection circuit 203 is omitted because known components can be used to form the pen pointing detection circuit 203. It is possible to eliminate the mutual effect of the detection circuits 202 and 203 by restricting the signal bands, for example, with a bandpass filter.

Figure 3:
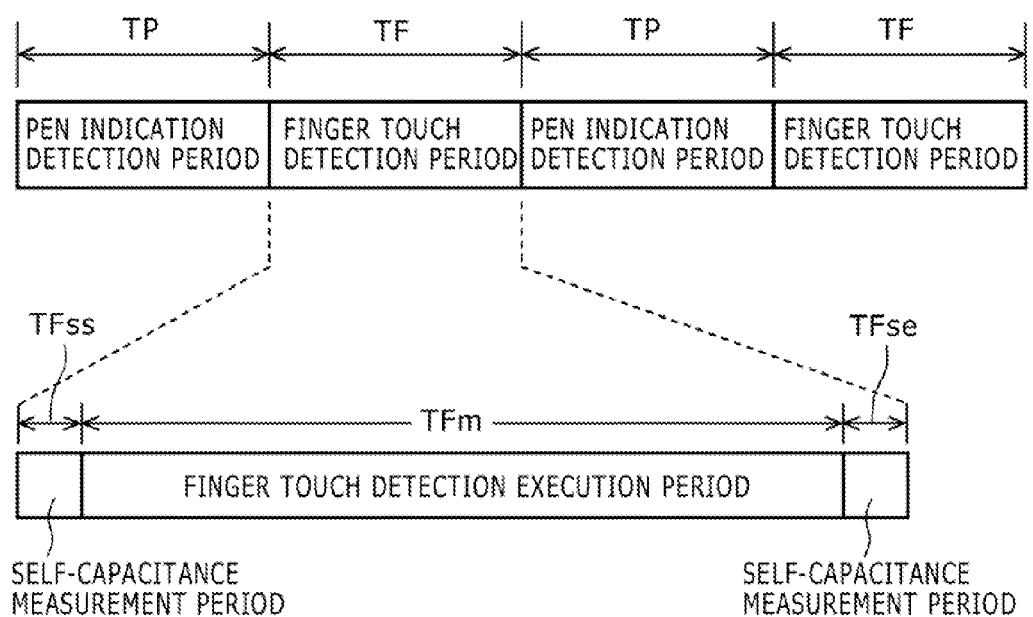
FIG. 3 is a diagram for describing an operation of the position detector according to the embodiment of the present disclosure.

The control circuit 204 is designed to control the operation of the position detector 1 as a whole and includes an MPU (microprocessor unit) in this example. The position detector 1 according to the present embodiment is controlled to detect finger touch and pen pointing in a time divided manner. That is, the position detector 1 according to the present embodiment handles a pen pointing detection period TP for detecting pen pointing and a finger touch detection period TF for detecting finger touch alternately in a time divided manner as illustrated in FIG. 3.

During the pen pointing detection period TP, the control circuit 204 controls the multiplexer 201 in such a manner as to connect the sensor section 100 to the pen pointing detection circuit 203 and activate the pen pointing detection circuit 203. During the finger touch detection period TF, the control circuit 204 controls the multiplexer 201 in such a manner as to connect the sensor section 100 to the finger touch detection circuit 202 and activate the finger touch detection circuit 202.

Then, in the position detector 1 according to the present embodiment, the finger touch detection period TF is further divided into a finger touch detection execution period TFm for executing the detection of finger touch and self-capacitance measurement periods for executing the self-capacitance measurement. These two periods are handled in a time divided manner. In the present embodiment, two self-capacitance measurement periods are provided, a period TFss that lasts up to immediately before the beginning of the finger touch detection execution period TFm and a period TFse that spans from immediately after the end of the finger touch detection execution period TFm to immediately before the end of the finger touch detection period TF.

The control circuit 204 controls the switching between the finger touch detection execution period TFm and the self-capacitance measurement periods TFss and TFse during the finger touch detection period TF. The control circuit 204 also controls the operation during the finger touch detection execution period TFm and the self-capacitance measurement periods TFss and TFse.

FIG. 4 illustrates an excerpt of the components, i.e., those of the cross-point (mutual capacitance) finger touch detection section, of the position detector 1 according to the present embodiment during the finger touch detection period. The multiplexer 201 and the pen pointing detection circuit 203 are not shown.

As illustrated in FIG. 4, the cross-point (mutual capacitance) finger touch detection circuit 202 includes a transmission section 20 and a reception section 30. Although not shown in FIG. 2, a clock generation circuit 40 generates a given clock signal CLK and supplies this signal to various sections. The clock generation circuit 40 is included in the control circuit 204 in some cases. The transmission section 20 and the reception section 30 are activated during the finger touch detection execution period TFm and detect the position pointed to by the finger as described below. During the self-capacitance measurement periods TFss and TFse, on the other hand, the transmission section 20 is not activated. As a result, a transmission signal is not supplied to the transmitting conductors 12Y. As will be described later, a signal processing circuit 31 of the reception section 30 performs voltage supply control based on control exercised by the control circuit 204 during the self-capacitance measurement periods TFss and TFse, thus measuring the self-capacitance.

In the present embodiment, the transmitting conductor group 12 of the sensor section 100 includes the 46 transmitting conductors $12Y_1$ to $12Y_{46}$ as illustrated in FIG. 2. A transmission signal generation circuit 21 of the transmission section 20 generates 46 different transmission signals at timings established by the clock signal CLK supplied from the clock generation circuit 40 in accordance with control exercised by the control circuit 204, supplying the given transmission signals respectively to the transmitting conductors $12Y_1$ to $12Y_{46}$. It should be noted that among specific examples of transmission signals that can be supplied to the 46 transmitting conductors $12Y_1$ to $12Y_{46}$ are orthogonal codes such as PN (pseudo random noise) codes and Hadamard codes.

A signal polarity inversion circuit 22 of the transmission section 20 changes (inverts) the polarity of a transmission signal as necessary based on the code string of the transmission signal. The position detector 1 according to the present embodiment relies on the cross-point capacitance technique as described above, detecting the pointer position based on the change in signals from the receiving conductors $11X_1$ to $11X_{72}$ in accordance with the transmission signals supplied to the transmitting conductors $12Y_1$ to $12Y_{46}$. That is, the position detection is achieved based on the change in capacitance corresponding to the position pointed to by the pointer such as finger.

When codes '0s' or '1s' are consecutive in the transmission signals generated by the transmission signal generation circuit 21, such is detected by the signal polarity inversion circuit 22 that determines whether or not the signals (codes) supplied to the transmitting conductors $12Y_1$ to $12Y_{46}$ immediately previously and the signals (codes) to be supplied next are at the same level. If the same signals (codes) are consecutive, the signal polarity inversion circuit 22 generates transmission signals (transmission codes) whose levels are changed (high or low levels) or are inverted.

It should be noted that if a transmission signal transmits different signals (codes) such as '01' or '10,' rising and falling edges are provided properly. Therefore, it is not necessary to change (invert) the polarity of the transmission signal.

The finger touch detection circuit 202 of the position detector 1 according to the present embodiment relies on the capacitance technique adapted to detect the position pointed to by the pointer such as a finger based on the change in capacitance. Therefore, it is possible to properly provide rising and falling edges of transmission signals supplied to the transmitting conductors $12Y_1$ to $12Y_{46}$ by controlling the polarity of the transmission signals using the signal polarity inversion circuit 22. As a result, the levels of reception signals from the receiving conductors $11X_1$ to $11X_{72}$ change properly. Then, the reception signals from the receiving conductors $11X_1$ to $11X_{72}$ are monitored, and the change in the reception signal associated with the transmission signal supplied to a certain one of the transmitting conductors is detected.

That is, the reception section 30 of the position detector 1 according to the present embodiment detects the signal change corresponding to the change in capacitance at each of the intersections (cross-points) between the transmitting conductors $12Y_1$ to $12Y_{46}$ and the receiving conductors $11X_1$ to $11X_{72}$. This makes it possible to identify the cross-point where the capacitance has changed in response to the approach of the pointer such as a finger to, or the contact thereof with, the sensor section 100.

It should be noted that the reception signals from the receiving conductors $11X_1$ to $11X_{72}$ are supplied to the signal processing circuit 31 and undergo A-D (Analog-Digital) conversion at the same time. As will be described in detail later, the signal processing circuit 31 receives the signals from the receiving conductors $11X_1$ to $11X_{72}$ in the form of a current and converts these signals into voltages and converts these analog voltages into digital ones using a multiple integral ADC (Analog Digital Converter). A multiple integral ADC is designed to convert electric charge stored in a capacitor circuit into a corresponding digital signal by sequentially discharging and charging the electric charge using a plurality of different reference currents.

A position detection circuit 32 performs correlation operations using signals (codes) corresponding to the transmission signals (transmission codes) supplied to the transmitting conductors $12Y_1$ to $12Y_{46}$ from the transmission signal generation circuit 21, thus calculating a correlation operation value. Therefore, the signal used for correlation operation (correlation operation signal) is supplied to the position detection circuit 32 from the transmission signal generation circuit 21. The position detection circuit 32 is activated in accordance with control exercised by the control circuit 204, detecting the position pointed to on the sensor section 100 by the pointer such as a finger based on the calculated correlation operation value. Output data corresponding to the position pointed to by the pointer is supplied, for example, to the display control section of the mobile device which is not shown, thus allowing information corresponding to the position pointed to by the pointer to be displayed on the display screen.

The position detector 1 according to the present embodiment configured as described above supplies transmission signals to the 46 transmitting conductors $12Y_1$ to $12Y_{46}$ at the same time and processes the reception signals from the 72 receiving conductors $11X_1$ to $11X_{72}$ at the same time. Then, the position detector 1 detects the position pointed to on the pointing input surface 100S by the pointer based on the pointing states of the pointer at the 3312 cross-points formed by the 46 transmitting conductors $12Y_1$ to $12Y_{46}$ and the 72 receiving conductors $11X_1$ to $11X_{72}$.

It should be noted that, in the description given below, the receiving conductors $11X_1$ to $11X_{72}$ will be collectively denoted as the receiving conductors 11X, and the transmitting conductors $12Y_1$ to $12Y_{46}$ will be collectively denoted as the transmitting conductors 12Y unless they are individually described.

[Specific Configuration Example of the Signal Processing Circuit 31 According to a First Embodiment]

Figure 5:
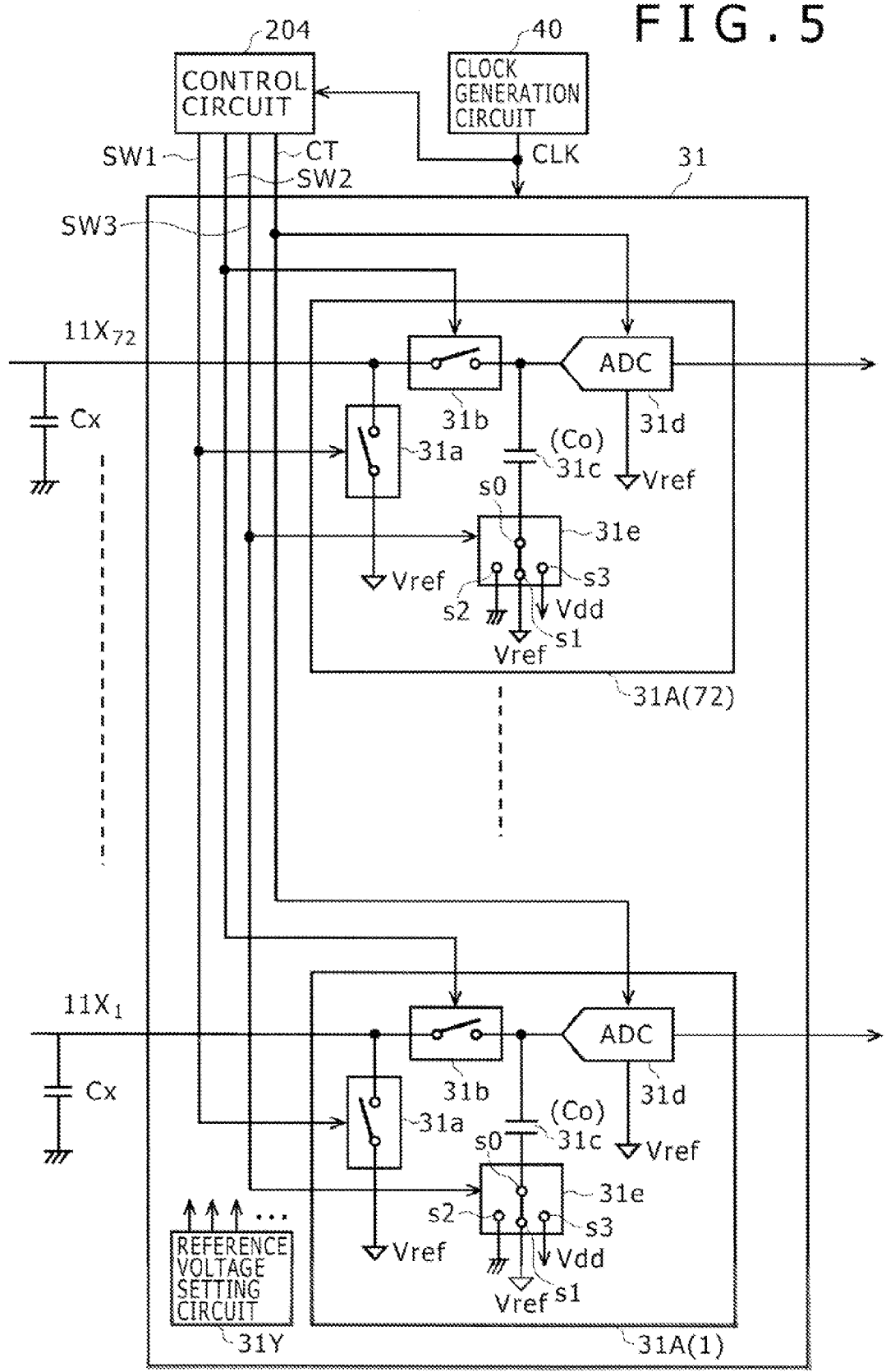
FIG. 5 is a block diagram illustrating a configuration example of a signal processing circuit according to a first embodiment of the present disclosure.

FIG. 5 is a diagram for describing a configuration example of the signal processing circuit 31 used for the position detector 1 according to a first embodiment. As illustrated in FIG. 5, the signal processing circuit 31 according to the first embodiment includes 72 signal processing circuits 31A (1) to 31A (72), each associated with one of the 72 receiving conductors $11X_1$ to $11X_{72}$. These 72 signal processing circuits 31A (1) to 31A (72) have the same configuration. In the description given below, therefore, one of the signal processing circuits 31A (1) to 31A (72) will be denoted as the signal processing circuit 31A unless they are individually described. It should be noted that the signal processing circuit 31A can be configured by electrically connecting a plurality of discrete parts, i.e., its components. In this case, however, the components thereof are integrated in a single IC (Integrated Circuit) chip.

In the present embodiment, the signal processing circuit 31 uses a single power source that supplies a source voltage Vdd.

As illustrated in FIG. 5, the signal processing circuit 31A includes a first switching circuit 31a, a gate circuit 31b used for sampling, a capacitor circuit 31c, an ADC (Analog Digital Converter) 31d, and a second switching circuit 31e. The first switching circuit 31a forms a clamp circuit. The capacitor circuit 31c holds the sampled voltage. The second switching circuit 31e switches between voltages used to measure the self-capacitance.

In the first embodiment, the control circuit 204 supplies a switching control signal SW1 to the first switching circuit 31a, a gate control signal SW2 to the gate circuit 31b, and a switching control signal SW3 to the second switching circuit 31e as illustrated in FIG. 5. These switching control signals SW1 and SW3 and gate control signal SW2 are in synchronism with the clock signal CLK supplied from the clock generation circuit 40. On the other hand, the ADC 31d is controlled to be active or inactive by an activation control signal CT supplied from the control circuit 204.

The first switching circuit 31a forming a clamp circuit has its first end connected to the receiving conductor 11X. The other (second) end of the first switching circuit 31a is set to a given voltage, and, in this example, to a reference voltage Vref which will be described later. Further, the gate circuit 31b also has its first end connected to the receiving conductor 11X. The gate circuit 31b also has its other (second) end connected to a first end of the capacitor circuit 31c and to the input end of the ADC 31d. The capacitor circuit 31c has its other (second) end connected to a common terminal s0 of the second switching circuit 31e. The voltage that develops at the first end of the capacitor circuit 31c is converted to a digital signal by the ADC 31d.

The second switching circuit 31e can switch the connection of the common terminal s0 between three terminals s1, s2, and s3. The terminal s1, one of the three terminals, is set to a given voltage, and to the reference voltage Vref in this example. The terminal s2, one of the other terminals, is set to a voltage which is lower by a given value EV than the given voltage (reference voltage Vref), and to a ground potential GND in this example. The terminal s3, the remaining terminal, is set to a voltage which is higher by the given value EV than the given voltage Vref, and to the source voltage Vdd in this example. During the finger touch detection execution period TFm, the second switching circuit 31e is typically switched to the terminal s1 which selects the reference voltage Vref. The other terminals s2 and s3 of the second switching circuit 31e are used during the self-capacitance measurement periods TFss and TFse in which the self-capacitance of the receiving conductor 11X is measured.

The first switching circuit 31a is turned ON by the switching control signal SW1 supplied from the control circuit 204, thus clamping the receiving conductor 11X to a given voltage. The gate circuit 31b is controlled to turn ON or OFF (controlled to open or close) by the gate control signal SW2 supplied from the control circuit 204, thus connecting, to the capacitor circuit 31c, the receiving conductor 11X that is clamped to the given voltage through the first switching circuit 31a that forms the clamp circuit during its ON period (during its closed period). The capacitor circuit 31c stores the charge corresponding to the given voltage to which the receiving conductor 11X is clamped and set. The voltage corresponding to the charge stored in the capacitor circuit 31c develops in the capacitor circuit 31c and is converted to a digital signal by the ADC 31d.

In the example shown in FIG. 5, the given voltage is set by a reference voltage setting circuit 31Y. It should be noted that the reference voltage setting circuit 31Y is provided in the signal processing circuit 31 for simplification of the description in the example shown in FIG. 5. However, it is not necessary to provide the reference voltage setting circuit 31Y in the signal processing circuit 31. It is only necessary to ensure that the second ends of the first switching circuit 31a and the capacitor circuit 31c take on desired voltages.

In the present embodiment, a single power source is used which supplies the source voltage Vdd. Therefore, the reference voltage Vref set by the reference voltage setting circuit 31Y is made equal to half the source voltage Vdd (Vref=½×Vdd). As a result, it is possible to positively detect both the rising and falling edges of the reception signal obtained from the receiving conductor 11X during the finger touch detection execution period TFm. Simply speaking, when the transmission signal is '1,' the voltage that develops in the capacitor circuit 31c is greater than the reference voltage Vref (=½×Vdd). Conversely, when the transmission signal is '0,' the voltage that develops in the capacitor circuit 31c is smaller than the reference voltage Vref (=½>Vdd). Irrespective of whether the transmission signal is '1' or '0,' it is possible to produce a voltage change of a proper signal level in the capacitor circuit 31c.

It should be noted that although, in the signal processing circuit 31 shown in FIG. 5, the first switching circuit 31a, the capacitor circuit 31c, and the ADC 31d are set to the same reference voltage Vref (=½×Vdd) during the finger touch detection execution period TFm, it is not typically necessary to set all these circuits to the same voltage.

It should be noted, however, that if the first switching circuit 31a, the capacitor circuit 31c, and the ADC 31d are set to the same potential as illustrated in FIG. 5, and if the reference voltage changes, these circuits will be affected by the same change in voltage. As a result, the effect of voltage change is substantially eliminated between the first switching circuit 31a, the capacitor circuit 31c, and the ADC 31d.

The ADC 31d used for the signal processing circuit 31A according to the first embodiment is a multiple integral ADC.

Figure 6:
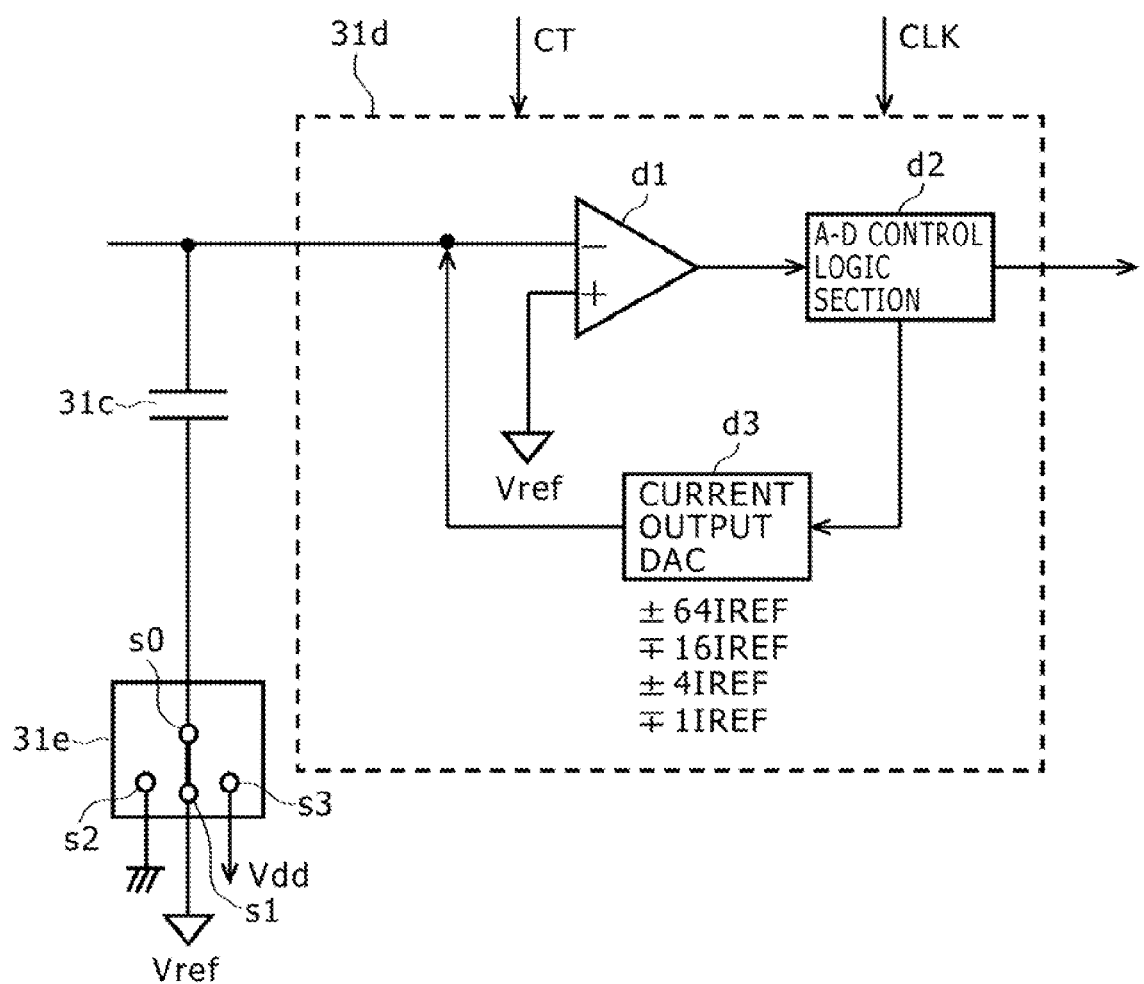
FIG. 6 is a diagram illustrating a configuration example of an ADC making up part of the signal processing circuit shown in FIG. 5.

FIG. 6 is a diagram for describing a configuration example of the ADC 31d. The ADC 31d includes a comparator d1, an A-D control logic section d2, and a current output DAC (Digital Analog Converter) d3.

As will be described later, the reference voltage Vref is applied to the second end of the capacitor circuit 31c of the signal processing circuit 31A via the second switching circuit 31e during the finger touch detection execution period TFm. As a result, with the reference voltage Vref used as a reference voltage, charge serving as a reception signal is supplied from the receiving conductor 11X to the capacitor circuit 31c via the gate circuit 31b for a given period of time, allowing this charge to be stored in the capacitor circuit 31c. As a result, the voltage corresponding to the charge stored in the capacitor circuit 31c is held by the capacitor circuit 31c. The voltage held by the capacitor circuit 31c is converted to a digital signal. The outline of the A-D conversion process handled by the ADC 31d is as follows.

In the ADC 31d, a reference current (64IREF to 1IREF shown in FIG. 6 (IREF is a given reference current value)) from the current output DAC d3 is supplied between the capacitor circuit 31c and the comparator d1 making up the ADC 31d. The reference current is set to a value that cancels the charge held by the capacitor circuit 31c. This allows the capacitor circuit 31c to inversely integrate the reference current, thus generating a digital signal corresponding to the charge held by the capacitor circuit 31c through this inverse integration.

In this case, the voltage that develops on the capacitor circuit 31c that varies as a result of the inverse integration using the reference current IREF and the reference voltage Vref are compared by the comparator d1. The result of this comparison is supplied to the A-D control logic section d2, thus detecting whether or not the polarity of the voltage that has developed on the capacitor circuit 31c has been inverted. Then, the ADC 31d repeats the series of steps, namely, inverse integration, comparison, and detection of polarity inversion, thus allowing the A-D control logic section d2 to measure the processing time corresponding to the charge held by the capacitor circuit 31c. It should be noted that the A-D control logic section d2 includes, for example, a counter that is activated based on the clock signal CLK and a controller adapted to control the timings at which the counter is to be reset and the count value is to be output although these components are not shown.

It should be noted that the ADC adapted to convert the voltage, which develops on the capacitor circuit 31c making up the signal processing circuit 31A, to a digital signal is not limited to an integral ADC. However, if the above signal processing circuit 31A and the integral ADC 31d are combined, the integral ADC 31d can output a digital signal corresponding to the charge held by the capacitor circuit 31c by cancelling the charge held by the capacitor circuit 31c with the given reference current. That is, the capacitor circuit 31c making up the signal processing circuit 31A also serves as a component making up the integral ADC 31d. Therefore, the signal processing circuit 31A and the integral ADC 31d are a suitable combination to integrally form an IC.

[Operation of the Signal Processing Circuit 31A during the Finger Touch Detection Execution Period TFm]

FIGS. 7A to 7F are timing charts for describing the operation of the signal processing circuit 31A according to the first embodiment. FIG. 7A illustrates a specific example of transmission signals (transmission codes) generated by the transmission signal generation circuit 21. Further, FIG. 7B illustrates the state of the signal supplied to the transmitting conductor 12Y via the transmission signal generation circuit 21 and the signal polarity inversion circuit 22. Still further, FIG. 7C illustrates the state of the transmission signal in the capacitor circuit 31c which is supplied from the receiving conductor 11X via the gate circuit 31b making up the signal processing circuit 31A.

Still further, FIG. 7D illustrates the switching control signal SW1 supplied from the control circuit 204 to the first switching circuit 31a. FIG. 7E illustrates the gate control signal SW2 supplied from the control circuit 204 to the gate circuit 31b. FIG. 7F illustrates the timing at which A-D conversion is performed by the ADC 31d.

It is assumed that the signals (transmission codes) supplied to the transmitting conductor 12Y are '0010' in this example, as illustrated in FIG. 7A. If '0s' or '1s' are consecutive as in the transmission signals of this example, it is difficult to provide rising and falling edges of the transmission signals properly. This makes it difficult for the capacitor circuit 31c to produce a change in capacitance corresponding to the change in transmission signal level.

Therefore, if the transmission code in FIG. 7A is '0,' a falling waveform is generated with a transition from '1' to '0' in FIG. 7B. If the next transmission code is again '0' in FIG. 7A, a transition is made from '0' to '1' in advance to prepare for the generation of a falling waveform. If the transmission code is '1' in FIG. 7A, a rising waveform is generated with a transition from '0' to '1' in FIG. 7B. If the next transmission code is '1' again in FIG. 7A, a transition is made from '1' to '0' in advance to prepare for the generation of a rising waveform.

Thus, the signal polarity inversion circuit 22, controlled by the control circuit 204, is provided to adjust the polarity of the transmission signal (high or low level) ahead of the transmission of the signal to the transmitting conductor 12Y.

A signal whose level corresponds to the level of the transmission signal (transmission code) illustrated in FIG. 7A is supplied to the transmitting conductor 12Y. In the example shown in FIG. 7, when the transmission signal is '0,' the level of the signal supplied to the transmitting conductor 12Y has a falling waveform, and when the transmission signal is '1,' the level of the signal supplied to the transmitting conductor 12Y has a rising waveform. In FIG. 7B, the timing at which the transmission signal level may change is denoted by 'Sd.'

As described above, when '0s' or '1s' are consecutive in the transmission signals, the polarity of the signal level supplied to the transmitting conductor 12Y is temporarily inverted. As a result, even if '0s' or '1s' are consecutive in the transmission signals, a change in capacitance takes place in the capacitor circuit 31c. It should be noted that, in this example, the signal level associated with the transmission signal of '0' is low. It is obvious, however, that the signal level associated with the transmission signal of '0' may be high. Further, the transmission signal may be PSK-modulated (BPSK-modulated in particular).

The first switching circuit 31a is turned ON by the switching control signal SW1 illustrated in FIG. 7D after the gate circuit 31b has been turned OFF (opened) by the gate control signal SW2 illustrated in FIG. 7E. As a result, the voltage of the receiving conductor 11X is quickly clamped to the reference voltage Vref as illustrated in FIG. 7C. It should be noted that although, in the example shown in FIG. 7D, the first switching circuit 31a is turned ON at time t1, the time at which the first switching circuit 31a is turned ON is not limited to time t1. It is only necessary to turn ON the first switching circuit 31a between time t6 when the A-D conversion begins and time t7 when the A-D conversion ends. The second switching circuit 31e is not switched to other terminal irrespective of which of the terminals is selected for the period of time from the beginning to end of the A-D conversion.

The first switching circuit 31a is turned OFF before time Sd when the level of the transmission signal changes next, as illustrated in FIG. 7D. As a result, the clamping of the voltage of the receiving conductor 11X to the reference voltage Vref is complete. It should be noted that, in the example shown in FIG. 7D, the first switching circuit 31a is turned OFF at time t3. However, the time at which the first switching circuit 31a is turned OFF is not limited to time t3. It is only necessary to turn OFF the first switching circuit 31a before time Sd when the level of the next transmission signal changes. That is, it is only necessary to turn OFF the first switching circuit 31a after the end of the A-D conversion, after the voltage of the receiving conductor 11X has been clamped to the reference voltage Vref, and in a cp period between time t2 and time Sd during which the voltage is stable.

The gate circuit 31b can be turned ON (closed) at time t2 after the end of the A-D conversion (period indicated by a dotted line in FIG. 7E). In the present embodiment, however, the gate circuit 31b is turned ON at time Sd when the level of the transmission signal can change as illustrated in FIG. 7E. Then, as the gate circuit 31b is controlled to be turned ON (closed), charge corresponding to the voltage of the receiving conductor 11X is stored in the capacitor circuit 31c.

The gate circuit 31b that is turned ON at time Sd is turned OFF (opened) at time t5, ahead of time Sj when the level of the signal supplied to the transmitting conductor 12Y changes and before time t6 when the A-D conversion begins. As the gate circuit 31b is turned OFF (opened), the voltage corresponding to the level of the reception signal is held by the capacitor circuit 31c. The analog voltage held by the capacitor circuit 31c is converted to a digital signal by the ADC 31d. As a result, a digital signal corresponding to the level of the reception signal is output from the ADC 31d.

The waveform of the voltage that develops on the capacitor circuit 31c connected to the receiving conductor 11X in response to the signal supplied to the transmitting conductor 12Y is a signal waveform approximately as shown in FIG. 7C. That is, in FIG. 7C, the first switching circuit 31a is turned ON in a given period of time as shown by the straight line segments denoted by reference numeral cp ahead of time Sd when the level of the transmission signal is switched. As a result, the receiving conductor 11X is clamped to the reference voltage Vref (Vref=½×Vdd).

As illustrated in FIG. 7C, a reception signal corresponding to the signal supplied to the transmitting conductor 12Y is supplied to the signal processing circuit 31A. That is, as the receiving conductor 11X clamped to the reference voltage Vref is connected to the capacitor circuit 31c via the gate circuit 31b, a voltage corresponding to the reception signal is produced in the capacitor circuit 31c. The variation of this voltage is centered around the reference voltage Vref. The voltage of the capacitor circuit 31c is converted to a digital signal by the ADC 31d as illustrated in FIG. 7F.

The ADC 31d initiates the A-D conversion of the voltage held by the capacitor circuit 31c at time t6 after time t5 and terminates the A-D conversion at time t7, outputting a digital signal corresponding to the voltage held by the capacitor circuit 31c. It should be noted that the ADC 31d is controlled to be active at the activation times shown in FIG. 7F by the activation control signal CT supplied from the control circuit 204.

It should be noted that each of times t1, t2, t3, t4, t5, t6, t7, Sd, and Sj is set by the control circuit 204 based on the clock signal CLK generated by the clock generation circuit 40.

[Operation of the Signal Processing Circuit 31A during the Self-Capacitance Measurement Periods TFss and TFse]

FIGS. 8A to 8C are diagrams for describing the transition of the states of the first and second switching circuits 31a and 31e of the signal processing circuit 31A and the transition of the open and closed states of the gate circuit 31b of the signal processing circuit 31A during the self-capacitance measurement periods TFss and TFse. As illustrated in FIG. 5, the control circuit 204 has a function of temporarily setting the receiving conductor 11X to a given voltage as will be described later by supplying the switching control signals SW1 and SW3 respectively to the first and second switching circuits 31a and 31e, and the gate control signal SW2 to the gate circuit 31b. Further, the control circuit 204 has a function of setting a given potential difference between the first and second ends of the gate circuit 31b provided by a switching circuit. That is, the control circuit 204 has functions of a voltage supply control circuit.

It should be noted that the second switching circuit 31e is connected to the terminal s1 during the finger touch detection execution period TFm so that the reference voltage Vref is applied to the second end of the capacitor circuit 31c as described above. However, this terminal s1 is not used during the self-capacitance measurement periods TFss and TFse. Therefore, the terminal s1 of the second switching circuit 31e is not shown in FIG. 8 for simplification of the description.

In FIG. 8, a capacitance Cx connected to the receiving conductor 11X represents a self-capacitance. The self-capacitance Cx includes a pattern capacitance and a stray capacitance of the receiving conductor 11X. When a finger touches the receiving conductor 11X, the self-capacitance Cx increases by the increment of the human body capacitance as a result of the touch.

Figure 9:
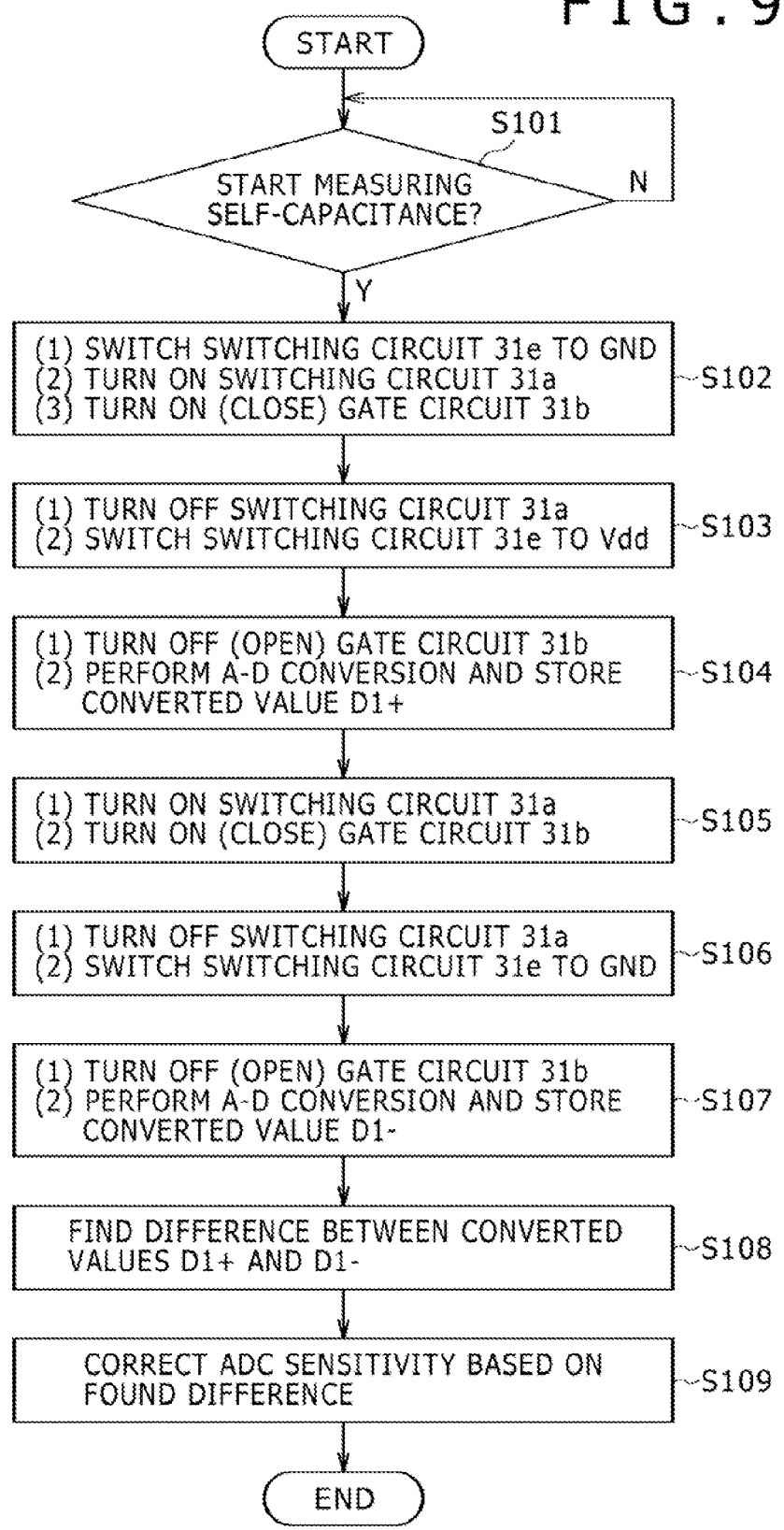
FIG. 9 is a diagram illustrating a flowchart for describing an operation flow of the major components of the signal processing circuit according to the first embodiment of the present disclosure.

It should be noted that, in the present embodiment, completely the same operation is performed during the self-capacitance measurement periods TFss and TFse, thus detecting the self-capacitance of the receiving conductor 11X during each period. Therefore, the self-capacitance measurement operation which will be described later is performed during both the self-capacitance measurement periods TFss and TFse. FIG. 9 is a flowchart illustrating an example of a flow of control exercised by the control circuit 204 on the signal processing circuit 31A during the self-capacitance measurement periods TFss and TFse. FIG. 9 primarily shows the operation of the control circuit 204 adapted to control the states of the first and second switching circuits 31a and 31e of the signal processing circuit 31A and the open and closed states of the gate circuit 31b of the signal processing circuit 31A so as to perform the self-capacitance measurement operation.

As described earlier, the transmission section 20 is inactive during the self-capacitance measurement periods TFss and TFse. Therefore, the reception section 30 does not process the reception signal. The control circuit 204 controls the signal processing circuit 31A to switch between voltages as described below, thus measuring the self-capacitance based on the voltage switching control.

It should be noted that the self-capacitance measurement periods TFss and TFse may be shorter than the finger touch detection execution period TFm. In the present embodiment, the finger touch detection execution period TFm is 47 chips (one chip being the length of a single code '1' or '0' of a spreading code) long in terms of an orthogonal code (spreading code), i.e., a transmission signal. In contrast, each of the self-capacitance measurement periods TFss and TFse is about one chip long in terms of the orthogonal code.

As illustrated in FIG. 9, the control circuit 204 monitors the start point of the self-capacitance measurement periods TFss and TFse (step S101). When determining that the start point of the self-capacitance measurement period TFss or TFse has been reached, the control circuit 204 performs the self-capacitance measurement operation as described below.

First, the control circuit 204 switches the second switching circuit 31e to the ground potential GND via the terminal s2, turns ON the first switching circuit 31a and turns ON (closes) the gate circuit 31b using the switching control signals SW1 and SW3 and the gate control signal SW2 as illustrated in FIG. 8A, thus connecting first end of the capacitor circuit 31c to the receiving conductor 11X. As a result, the first end of the gate circuit 31b to which the receiving conductor 11X is connected is temporarily clamped to the reference voltage Vref. Further, the first end of the capacitor circuit 31c connected to the second end of the gate circuit 31b is clamped to the reference voltage Vref (step S102).

Next, the control circuit 204, using the switching control signals SW1 and SW3 and the gate control signal SW2 as illustrated in FIG. 8B, leaves the gate circuit 31b ON (closed), turns OFF the first switching circuit 31a, and switches the second switching circuit 31e over to the terminal s3, thus setting the second end of the capacitor circuit 31c, i.e., the end opposite from the first end of the capacitor circuit 31c that is connected to the second end of the gate circuit 31b, to the source voltage Vdd. As a result, the first end of the capacitor circuit 31c is charged up to the source voltage Vdd, setting a potential difference between the first and second ends of the gate circuit 31b. Then, the electric charge is drawn from the second end to the first end of the gate circuit 31*b* through the gate circuit 31*b*, and a resulting electric charge is stored in the capacitor circuit 31*c* as an external electrode capacitance (self-capacitance) (step S103).

Next, the control circuit 204 turns OFF (opens) the gate circuit 31*b* using the gate control signal SW2 as illustrated in FIG. 8C. Further, the control circuit 204 activates the ADC 31*d* using the activation control signal CT, converts the voltage held by the capacitor circuit 31*c* to a digital signal D1+ using the ADC 31*d*, and temporarily stores the digital signal D1+ (step S104).

Description will be given next of the fact that the self-capacitance Cx can be calculated from the digital signal D1+ obtained from the above steps S102 to S104.

Here, an internal capacitance of the capacitor circuit 31*c* (including the stray capacitance) is denoted by Co. Then, the voltage of the connection point between the first end of the capacitor circuit 31*c* and the ADC 31*d*, i.e., the input voltage of the ADC 31*d*, is denoted by Vco.

Letting the input voltage of the ADC 31*d* at the time of clamping of the receiving conductor 11X and the input end of the ADC 31*d* to the reference voltage Vref in step S102 be denoted by Vco (Be), this voltage Vco (Be) is equal to Vref as illustrated in Formula 1 of FIG. 17.

Then, letting the input voltage of the ADC 31*d* at the time of charging of the capacitor circuit 31*c* in step S103 be denoted by Vco (Af), this voltage Vco (Af) is as illustrated in Formula 2 of FIG. 17.

At this time, the capacitor circuit 31*c* holds a voltage change ΔV, the difference between the voltage Vco (Be) and the voltage Vco (Af) at the time of switching of the second switching circuit 31*e* from the ground potential GND over to the source voltage Vdd. This voltage change ΔV held by the capacitor circuit 31*c* is as shown by Formula 3 in FIG. 17.

Based on Formula 3, therefore, the self-capacitance Cx can be measured as illustrated in Formula 4 of FIG. 17. That is, the self-capacitance Cx can be measured from the A-D conversion value D1+ obtained in step S104. However, the A-D conversion value D1+ obtained in step S104 includes an offset that occurs in the ADC 31*d*. In the present embodiment, the following steps S105 to S107 are performed to eliminate this offset for more accurate measurement of the self-capacitance Cx.

That is, after step S104, the control circuit 204 switches the second switching circuit 31*e* over to the source voltage Vdd via the terminal s3 as illustrated by a dotted line in FIG. 8A, turns ON the first switching circuit 31*a*, and turns ON (closes) the gate circuit 31*b* using the switching control signals SW1 and SW3 and the gate control signal SW2, thus connecting the first end of the capacitor circuit 31*c* to the receiving conductor 11X. As a result, the first end of the gate circuit 31*b* to which the receiving conductor 11X is connected is temporarily clamped to the reference voltage Vref. Further, the first end of the capacitor circuit 31*c* connected to the second end of the gate circuit 31*b* is clamped to the reference voltage Vref (step S105).

Next, the control circuit 204, using the switching control signals SW1 and SW3 and the gate control signal SW2 as illustrated in FIG. 8B, leaves the gate circuit 31*b* ON (closed), turns OFF the first switching circuit 31*a*, and switches the second switching circuit 31*e* over to the ground potential GND via the terminal s2 as illustrated by a dotted line, thus setting the second end of the capacitor circuit 31*b*, i.e., the end opposite from the first end of the capacitor circuit 31*b* connected to the second end of the gate circuit 31*b*, to the ground potential GND. As a result, the first end of the capacitor circuit 31*c* is discharged down to the ground potential GND (step S106).

Next, the control circuit 204 turns OFF (opens) the gate circuit 31*b* using the gate control signal SW2 as illustrated in FIG. 8C. Further, the control circuit 204 activates the ADC 31*d* using the activation control signal CT, converts the voltage held by the capacitor circuit 31*c* to a digital signal D1− using the ADC 31*d*, and temporarily stores the digital signal D1− (step S107).

Next, the control circuit 204 finds the difference between the digital signals D1+ and D1− (step S108).

In the above steps 102 to 104, the second end of the capacitor circuit 31*c* is switched from the ground potential GND over to the source voltage Vdd, with the receiving conductor 11X clamped to the reference voltage Vref. In contrast, in steps S105 to S107, the second end of the capacitor circuit 31*c* is switched from the source voltage Vdd over to the ground potential GND, with the receiving conductor 11X clamped to the reference voltage Vref. In steps S105 to S107, therefore, the voltage change ΔV of the same magnitude relative to the reference voltage Vref is also made to the voltage applied to the second end of the capacitor circuit 31*c*. In steps S102 to S104, a voltage is applied in such a manner as to charge the capacitor circuit 31*c*. In steps S105 to S107, on the other hand, a voltage is applied in such a manner as to discharge the capacitor circuit 31*c*.

For this reason, it is possible to measure the self-capacitance at twice the level by taking the difference between the digital signals D1+ and D1−. Then, each of the digital signals D1+ and D1− includes the same offset of the ADC 31*d*. Therefore, the subtraction of the digital signals D1+ and D1− cancels out the offsets, thus allowing the self-capacitance Cx to be measured with more accuracy. That is, in step S108, it is possible to measure the more accurate self-capacitance Cx free from the offset that occurs in the ADC 31*d*.

The control circuit 204 generates, based on the measured self-capacitance Cx, a correction signal used to correct the finger touch detection result (output signal from the ADC 31*d*) obtained from the ADC 31*d* during the finger touch detection execution period TFm, thus correcting the finger touch detection result (output signal from the ADC 31*d*) using the correction signal (step S109).

A sensitivity change of the ADC 31*d* in relation to the finger touch detection result can be represented by Formula 5 of FIG. 17. Then, the digital signal from the ADC 31*d* can be corrected as illustrated in Formula 6 of FIG. 17. It should be noted that Cx (Ini) in Formulas 5 and 6 is the self-capacitance before change due, for example, to finger touch. ΔV (Ini) is the voltage change ΔV (=Vco (AF)−Vco (Be)) when the self-capacitance is Cx (Ini).

Thus, in the above embodiment, the position detector detects the change in capacitance corresponding to a position pointed to by the pointer as a voltage signal from the capacitor circuit. The signal processing circuit of the position detector corrects the finger touch detection signal obtained during the finger touch detection execution period based on the correction signal generated to correspond to the measured self-capacitance of each of the receiving conductors. This makes it possible to prevent a change in finger touch detection sensitivity even in the event of an increase in the self-capacitance of the receiving conductor touched by a finger.

It should be noted that a case has been described above in which the signal processing circuits 31 are driven by a single power source with the source voltage Vdd. However, the present embodiment is applicable even when the signal processing circuits 31 are driven by two power sources with the positive and negative source voltages ±Vdd. If the signal processing circuits 31 are driven by two power sources with the positive and negative source voltages ±Vdd, it is preferred that the ground potential, which is the median between the positive and negative source voltages +Vdd and −Vdd, should be used as the reference voltage (Vref). Then, if two voltage sources are used, it is preferred that the voltage higher than the reference voltage Vref by the given value EV should be treated as the positive source voltage +Vdd, and that the voltage lower than the reference voltage Vref by the given value EV should be treated as the negative source voltage −Vdd. This is also true for second and third embodiments described below.

Second Embodiment

The second embodiment differs from the first embodiment in the configuration of each of the 72 signal processing circuits of the signal processing circuit 31 associated with the 72 receiving conductors $11X_1$ to $11X_{72}$. The second embodiment is identical to the first embodiment in all other respects including the fact that the signal processing circuit 31 is driven by a single power source with the source voltage Vdd.

Figure 10:
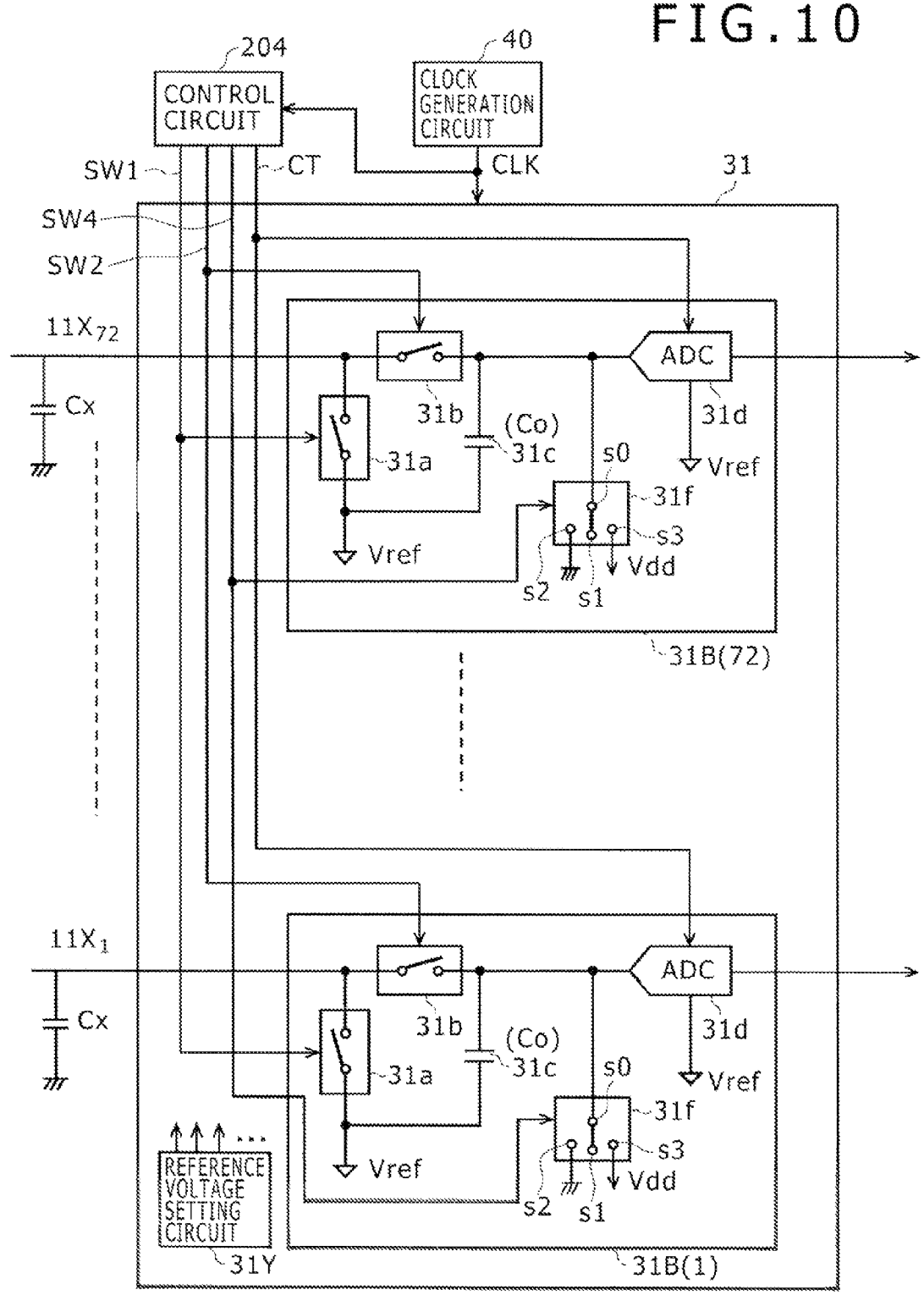
FIG. 10 is a block diagram illustrating a configuration example of a signal processing circuit according to a second embodiment of the present disclosure.

FIG. 10 is a diagram for describing a configuration example of the signal processing circuit 31 according to the second embodiment. In FIG. 10, the same components as those in the first embodiment are denoted by the same reference numerals.

In the second embodiment, the signal processing circuit 31 includes 72 signal processing circuits 31B (1) to 31B (72), each associated with one of the 72 receiving conductors $11X_1$ to $11X_{72}$, as illustrated in FIG. 10. These 72 signal processing circuits 31B (1) to 31B (72) have the same configuration. In the description given below, the signal processing circuits 31B (1) to 31B (72) will be collectively denoted as the signal processing circuits 31B unless they are individually described. It should be noted that the signal processing circuit 31B is integrated in an IC chip in this example as is the signal processing circuit 31A according to the first embodiment.

As illustrated in FIG. 10, the signal processing circuit 31B includes the first switching circuit 31a, the gate circuit 31b used for sampling, the capacitor circuit 31c, the ADC (Analog Digital Converter) 31d, and a second switching circuit 31f. The first switching circuit 31a makes up a clamp circuit. The capacitor circuit 31c holds the sampled voltage. The second switching circuit 31f switches between voltages used to measure the self-capacitance. The second switching circuit 31f can switch the connection of the common terminal s0 between the three terminals s1, s2, and s3 as does the second switching circuit 31e according to the first embodiment.

In the second embodiment, the second end of the capacitor circuit 31c is set to the reference voltage Vref, which is not the case with the signal processing circuit 31A according to the first embodiment shown in FIG. 5. In the second embodiment, the connection point between the first end of the capacitor circuit 31c and the input end of the ADC 31d is connected to the common terminal s0 of the second switching circuit 31f adapted to switch between voltages for measurement of the self-capacitance. Then, the terminal s1 of the second switching circuit 31f is a free end. The terminal s2 is set to a voltage which is lower by the given value EV than the reference voltage Vref, and to the ground potential GND in this example. The terminal s3 is set to a voltage which is higher by the given value EV than the reference voltage Vref, and to the source voltage Vdd in this example. During the finger touch detection execution period TFm described above (refer to FIG. 3), the second switching circuit 31f is switched to the terminal s1, a free end. The other terminals s2 and s3 of the second switching circuit 31f are used during the self-capacitance measurement periods TFss and TFse (refer to FIG. 3) in which the self-capacitance of the receiving conductor 11X is measured as will be described later.

In the second embodiment, the control circuit 204 having functions of a voltage supply control circuit supplies the switching control signal SW1 to the first switching circuit 31a, the gate control signal SW2 to the gate circuit 31b, and the activation control signal CT to the ADC 31d as in the first embodiment. Then, in the second embodiment, the control circuit 204 supplies a switching control signal SW4 to the second switching circuit 31f.

The operation of the signal processing circuit 31B according to the second embodiment during the finger touch detection execution period TFm is the same as that of the signal processing circuit 31A according to the first embodiment. Therefore, the description thereof is omitted.

[Operation of the Signal Processing Circuit 31B during the Self-Capacitance Measurement Periods TFss and TFse]

Figure 11A:
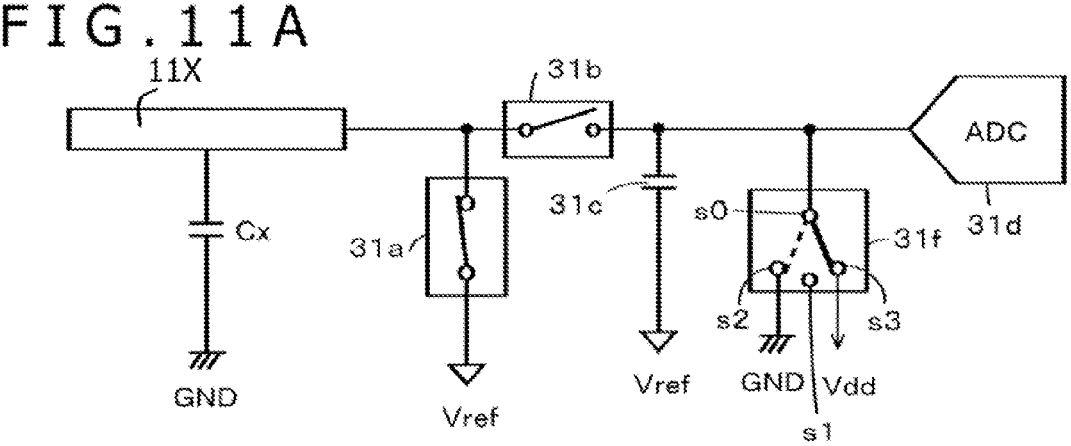
FIGS. 11A to 11C are diagrams for describing an operation of major components of the signal processing circuit according to the second embodiment of the present disclosure.
Figure 11B:
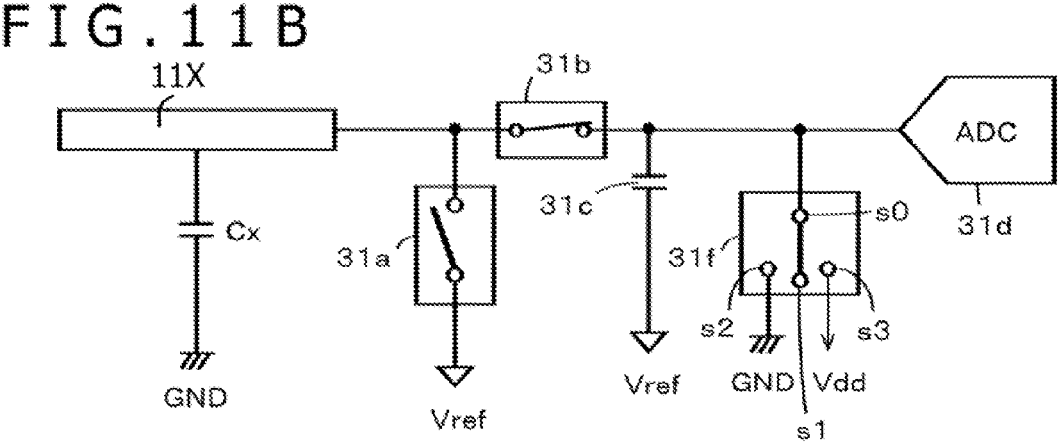
Figure 11C:
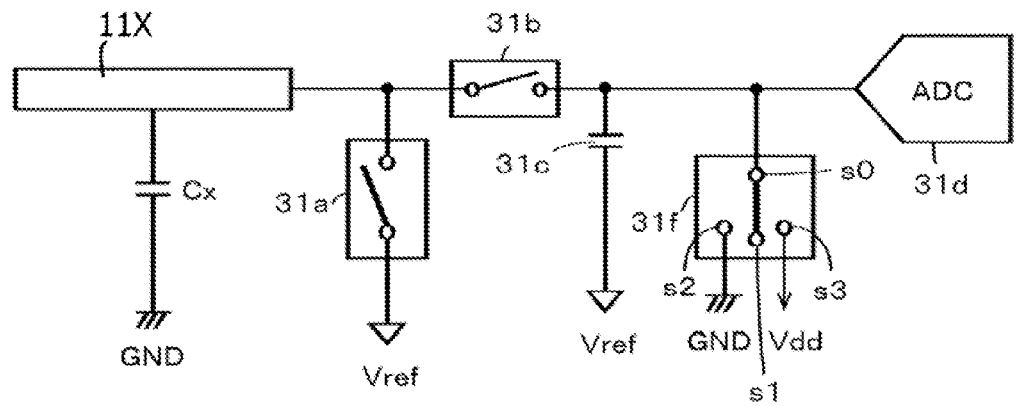

FIGS. 11A to 11C are diagrams for describing the transition of the states of the first and second switching circuits 31a and 31f of the signal processing circuit 31B and the transition of the open and closed states of the gate circuit 31b of the signal processing circuit 31B during the self-capacitance measurement periods TFss and TFse.

FIG. 12 is a flowchart illustrating an example of a flow of control exercised by the control circuit 204 on the signal processing circuit 31B during the self-capacitance measurement periods TFss and TFse. FIG. 12 primarily shows the operation of the control circuit 204 adapted to control the states of the first and second switching circuits 31a and 31f of the signal processing circuit 31B and the open and closed states of the gate circuit 31b of the signal processing circuit 31B so as to perform the self-capacitance measurement operation.

As illustrated in FIG. 12, the control circuit 204 monitors the start point of the self-capacitance measurement periods TFss and TFse (step S201). When determining that the start point of the self-capacitance measurement period TFss or TFse has been reached, the control circuit 204 performs the self-capacitance measurement operation as described below.

First, the control circuit 204 switches the second switching circuit 31f to the source voltage Vdd, turns ON the first switching circuit 31a and turns ON (closes) the gate circuit 31b using the switching control signals SW1 and SW4 and the gate control signal SW2 as illustrated in FIG. 11A, temporarily clamping, to the reference voltage Vref, the first end of the gate circuit 31b to which the receiving conductor 11X is connected and setting, to the source voltage Vdd different from the reference voltage Vref, the first end of the capacitor circuit 31c to which the second end of the gate circuit 31b is connected (step S202).

Next, the control circuit 204 turns OFF the first switching circuit 31a, switches the second switching circuit 31f to the free end, and turns ON (closes) the gate circuit 31b using the switching control signals SW1 and SW4 and the gate control signal SW2 as illustrated in FIG. 11B, thus connecting the first end of the capacitor circuit 31c to the receiving conductor 11X. As a result, the capacitor circuit 31c discharges because of the potential difference between the first and second ends of the gate circuit 31*b*, bringing the first end of the capacitor circuit 31*c* to the same voltage as the receiving conductor 11X (step S203). It should be noted that when the capacitor circuit 31*c* discharges, the gate circuit 31*b* may open and close a plurality of times to transfer the charge from the capacitor circuit 31*c* so as to ensure that the capacitor circuit 31*c* can discharge properly.

Next, the control circuit 204 turns OFF (opens) the gate circuit 31*b* using the gate control signal SW2 as illustrated in FIG. 11C. Further, the control circuit 204 activates the ADC 31*d* using the activation control signal CT, converts the voltage held by the capacitor circuit 31*c* to a digital signal D2+ using the ADC 31*d*, and temporarily stores the digital signal D2+ (step S204).

Description will be given next of the fact that the self-capacitance Cx can be calculated from the digital signal D2+ obtained from the above steps S202 to S204.

Letting the input voltage of the ADC 31*d* at the time of clamping of the input end of the ADC 31*d* to the source voltage Vdd in step S202 be denoted by Vco (Be), this voltage Vco (Be) is equal to Vdd as illustrated in Formula 7 of FIG. 18.

Then, letting the input voltage of the ADC 31*d* at the time of discharging of the capacitor circuit 31*c* in step S203 be denoted by Vco (Af), this voltage Vco (Af) is as illustrated in Formula 8 of FIG. 18.

At this time, the capacitor circuit 31*c* holds the voltage change ΔV, the difference between the voltage Vco (Be) and the voltage Vco (Af). This voltage change ΔV held by the capacitor circuit 31*c* is as shown by Formula 9 in FIG. 18. Based on Formula 9, therefore, the self-capacitance Cx can be measured as illustrated in Formula 10 of FIG. 18. That is, the self-capacitance Cx can be measured from the A-D conversion value D2+ obtained in step S204. However, the A-D conversion value D2+ obtained in step S204 includes an offset that occurs in the ADC 31*d*. Similarly in the second embodiment, the following steps S205 to S207 are performed to eliminate this offset for more accurate measurement of the self-capacitance Cx.

That is, after step S204, the control circuit 204 switches the second switching circuit 31*f* over to the ground potential GND as illustrated by a dotted line in FIG. 11A, turns ON the first switching circuit 31*a*, and turns OFF (opens) the gate circuit 31*b* using the switching control signals SW1 and SW4 and the gate control signal SW2, temporarily clamping, to the reference voltage Vref, the first end of the gate circuit 31*b* to which the receiving conductor 11X is connected and setting, to the ground potential GND different from the reference voltage Vref, the first end of the capacitor circuit 31*c* to which the second end of the gate circuit 31*b* is connected (step S205).

Next, the control circuit 204 turns OFF the first switching circuit 31*a*, switches the second switching circuit 31*f* to the free end, and turns ON (closes) the gate circuit 31*b* using the switching control signals SW1 and SW4 and the gate control signal SW2 as illustrated in FIG. 11B, thus connecting the first end of the capacitor circuit 31*c* to the receiving conductor 11X. As a result, the capacitor circuit 31*c* charges because of the potential difference between the first and second ends of the gate circuit 31*b*. Further, the first end of the capacitor circuit 31*c* is brought to the same voltage as the receiving conductor 11X (step S206).

Next, the control circuit 204 turns OFF (opens) the gate circuit 31*b* using the gate control signal SW2 as illustrated in FIG. 11C. Further, the control circuit 204 activates the ADC 31*d* using the activation control signal CT, converts the voltage held by the capacitor circuit 31*c* to a digital signal D2− using the ADC 31*d*, and temporarily stores the digital signal D2− (step S207).

Next, following step S207, the control circuit 204 finds the difference between the digital signals D2+ and D2−, thus acquiring the self-capacitance free from offset at twice the level (step S208).

The control circuit 204 generates, based on the measured self-capacitance Cx, a correction signal used to correct the finger touch detection result (output signal from the ADC 31*d*) obtained from the ADC 31*d* during the finger touch detection execution period TFm, thus correcting the finger touch detection result (output signal from the ADC 31*d*) using the correction signal (step S209).

The sensitivity change of the ADC 31*d* in relation to the finger touch detection result can be represented by Formula 11 of FIG. 18. Then, the digital signal from the ADC 31*d* can be corrected as illustrated in Formula 12 of FIG. 18.

Similarly in the second embodiment, the finger touch detection signal obtained during the finger touch detection execution period TFm is corrected using a correction signal generated to correspond to the measured self-capacitance of each of the receiving conductors. This makes it possible to prevent a change in finger touch detection sensitivity even in the event of an increase in the self-capacitance of the receiving conductor touched by a finger.

Third Embodiment

The third embodiment differs from the first and second embodiments in the configuration of each of the 72 signal processing circuits of the signal processing circuit 31 associated with the 72 receiving conductors $11X_1$ to $11X_{72}$. The third embodiment is identical to the first and second embodiments in all other respects including the fact that the signal processing circuit 31 is driven by a single power source with the source voltage Vdd.

Figure 13:
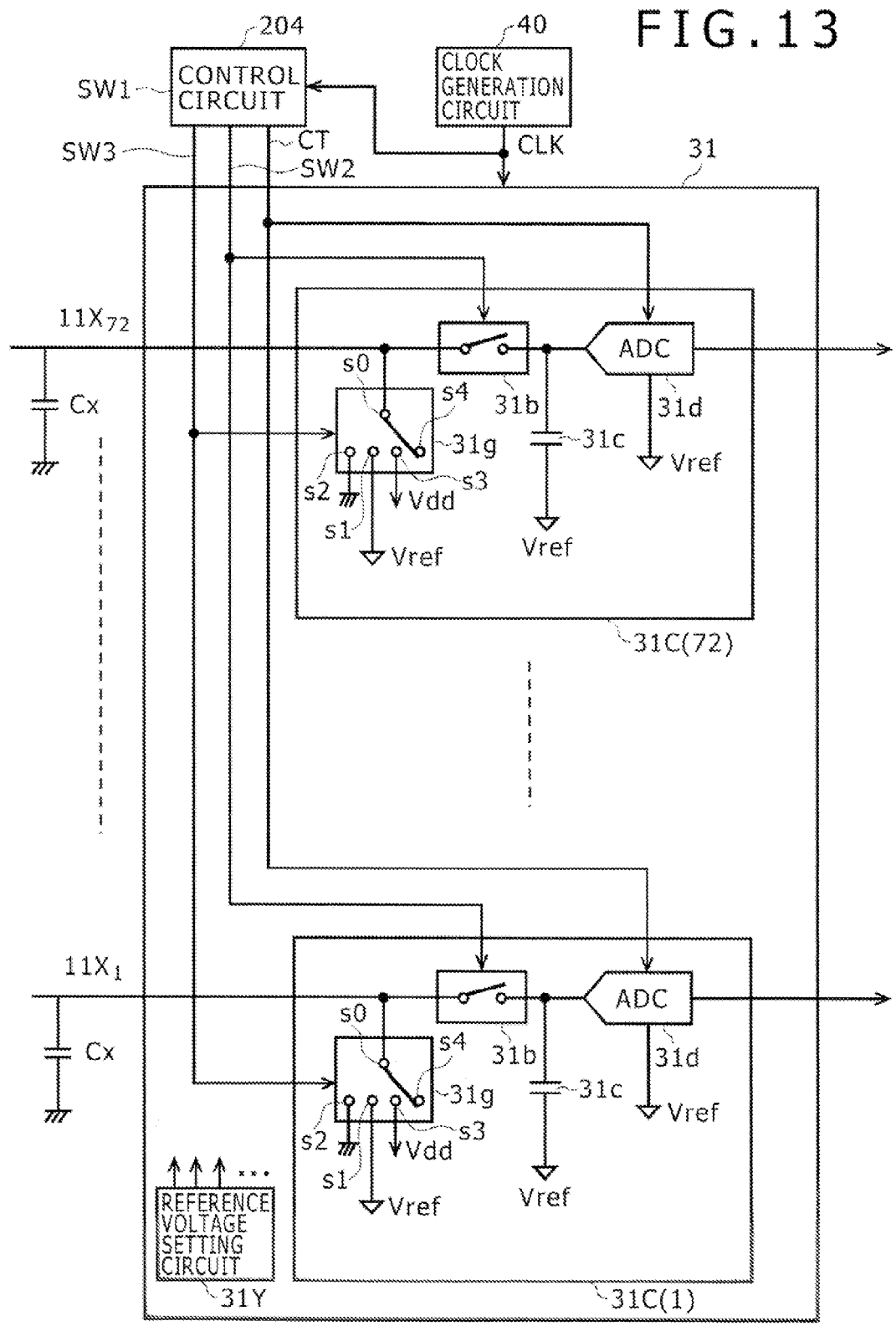
FIG. 13 is a block diagram illustrating a configuration example of a signal processing circuit according to a third embodiment of the present disclosure.

FIG. 13 is a diagram for describing a configuration example of the signal processing circuit 31 according to the third embodiment. In FIG. 13, the same components as those in the first embodiment are denoted by the same reference numerals.

In the third embodiment, the signal processing circuit 31 includes 72 signal processing circuits 31C (1) to 31C (72), each associated with one of the 72 receiving conductors $11X_1$ to $11X_{72}$, as illustrated in FIG. 13. These 72 signal processing circuits 31C (1) to 31C (72) have the same configuration. In the description given below, the signal processing circuits 31C (1) to 31C (72) will be collectively denoted as the signal processing circuits 31C unless they are individually described. It should be noted that the signal processing circuit 31C is integrated in an IC chip in this example as is the signal processing circuit 31A according to the first embodiment.

As illustrated in FIG. 13, the signal processing circuit 31C includes the gate circuit 31*b* used for sampling, the capacitor circuit 31*c*, the ADC (Analog Digital Converter) 31*d*, and a switching circuit 31*g*. The capacitor circuit 31*c* holds the sampled voltage. The switching circuit 31*g* switches between voltages used to measure the self-capacitance. The switching circuit 31*g* also has a function of forming a clamp circuit during the finger touch detection execution period TFm.

The switching circuit 31*g* can switch the connection of the common terminal s0 between four terminals s1, s2, s3, and s4.

In the third embodiment, the second end of the capacitor circuit 31c is set to the reference voltage Vref as is the signal processing circuit 31B according to the second embodiment. In the third embodiment, the switching circuit 31g is used instead of the first switching circuit 31a. That is, the common terminal s0 of the switching circuit 31g is connected to the connection point between the receiving conductor 11X and the gate circuit 31b. Then, the terminal s1 of the switching circuit 31g is set to the reference voltage Vref, the terminal s2 thereof is set to the ground potential GND, the terminal s3 thereof is set to the source voltage Vdd, and the terminal s4 thereof is left as a free end.

During the finger touch detection execution period TFm, the switching circuit 31g is switched between the terminal s4, a free end, and the terminal s1 that is set to the reference voltage Vref. This is the same operation as that of the first switching circuit 31a according to the above embodiments during the finger touch detection execution period TFm. That is, the switching circuit 31g serves as the first switching circuit 31a during the finger touch detection execution period TFm.

Then, during the self-capacitance measurement periods TFss and TFse, the switching circuit 31g is used to switch between the terminals s1 to s4 so as to measure the self-capacitance of the receiving conductor 11X as will be described later. Similarly in the third embodiment, the control circuit 204 having functions of a voltage supply control circuit supplies the gate control signal SW2 to the gate circuit 31b, and the activation control signal CT to the ADC 31d. Further, the control circuit 204 supplies a switching control signal SW5 to the switching circuit 31g.

The operation of the signal processing circuit 31C according to the third embodiment during the finger touch detection execution period TFm is the same as that of the signal processing circuit 31A according to the first embodiment. Therefore, the description thereof is omitted.

[Operation of the Signal Processing Circuit 31C during the Self-Capacitance Measurement Periods TFss and TFse]

FIGS. 14A to 14C and FIGS. 14D to 14F are diagrams for describing the transition of the states of the switching circuit 31g of the signal processing circuit 31C and the transition of the open and closed states of the gate circuit 31b of the signal processing circuit 31C during the self-capacitance measurement periods TFss and TFse.

FIG. 15 is a flowchart illustrating an example of a flow of control exercised by the control circuit 204 on the signal processing circuit 31C during the self-capacitance measurement periods TFss and TFse. FIG. 15 primarily shows the operation of the control circuit 204 adapted to control the states of the switching circuit 31g of the signal processing circuit 31C and the open and closed states of the gate circuit 31b of the signal processing circuit 31C so as to perform the self-capacitance measurement operation.

As illustrated in FIG. 15, the control circuit 204 monitors the start point of the self-capacitance measurement periods TFss and TFse (step S301). When determining that the start point of the self-capacitance measurement period TFss or TFse has been reached, the control circuit 204 performs the self-capacitance measurement operation as described below.

Figure 14A:
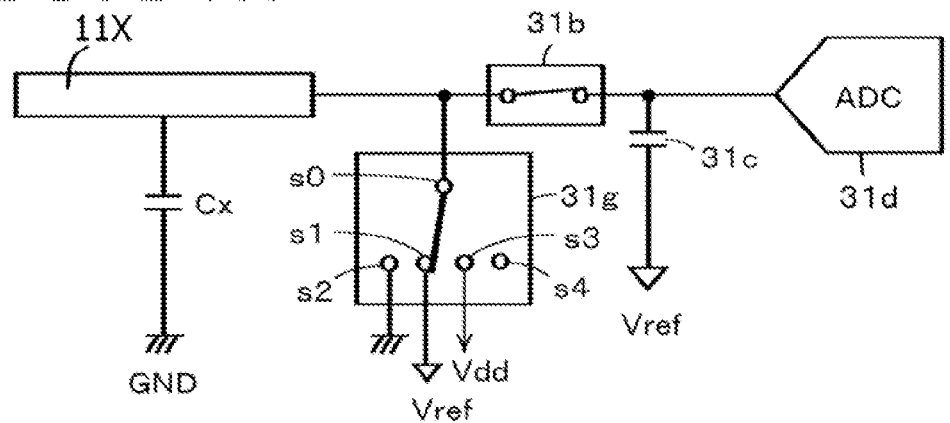
FIGS. 14A to 14C are diagrams for describing an operation of major components of the signal processing circuit according to the third embodiment of the present disclosure.

First, the control circuit 204 turns ON (closes) the gate circuit 31b and switches the switching circuit 31g to the terminal s1 that is set to the reference voltage Vref using the gate control signal SW2 and the switching control signal SW5 as illustrated in FIG. 14A, thus clamping the receiving conductor 11X to the reference voltage Vref, and setting, to the reference voltage Vref, the first end of the capacitor circuit 31c (step S302). That is, as a result of the switching control of the gate circuit 31b and the switching circuit 31g by the control circuit 204, the first end of the gate circuit 31b to which the receiving conductor 11X is connected is temporarily set to the reference voltage Vref, with the receiving conductor 11X connected to the capacitor circuit 31c via the gate circuit 31b.

Figure 14B:
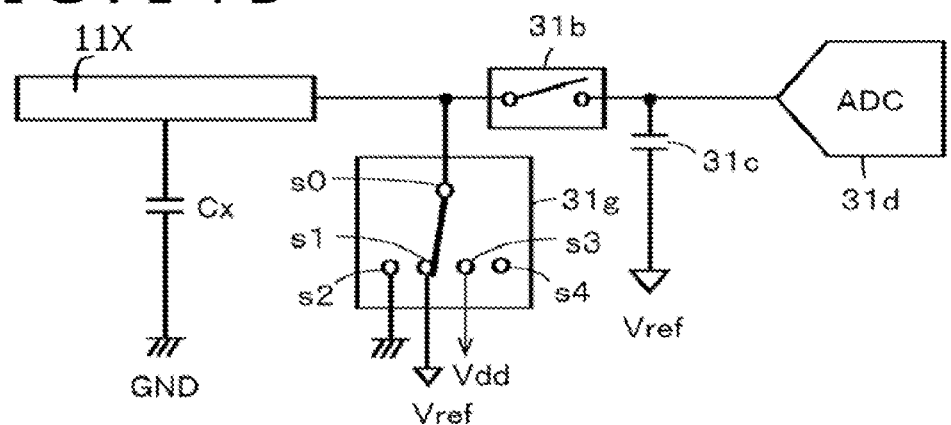
Figure 14C:
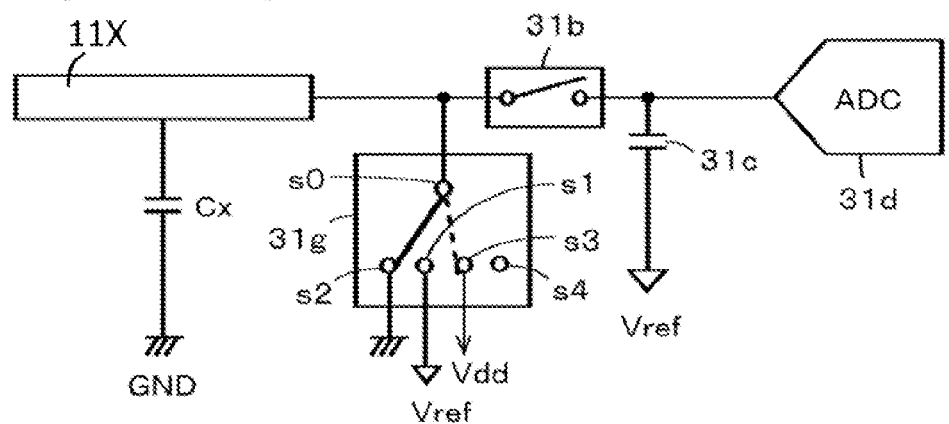

Next, the control circuit 204 turns OFF (opens) the gate circuit 31b using the gate control signal SW2 as illustrated in FIG. 14B, and then switches the switching circuit 31g to the terminal s2 using the switching control signal SW5 as illustrated in FIG. 14C, setting, to the ground potential GND different from the reference voltage Vref, the first end of the gate circuit 31b to which the receiving conductor 11X is connected (step S303).

Figure 14D:
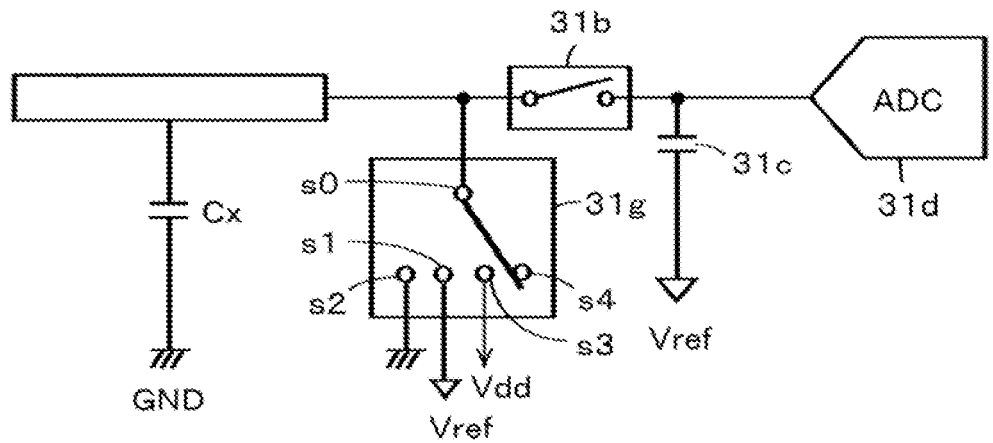
FIGS. 14D to 14F are diagrams for describing the operation of major components of the signal processing circuit according to the third embodiment of the present disclosure.
Figure 14E:
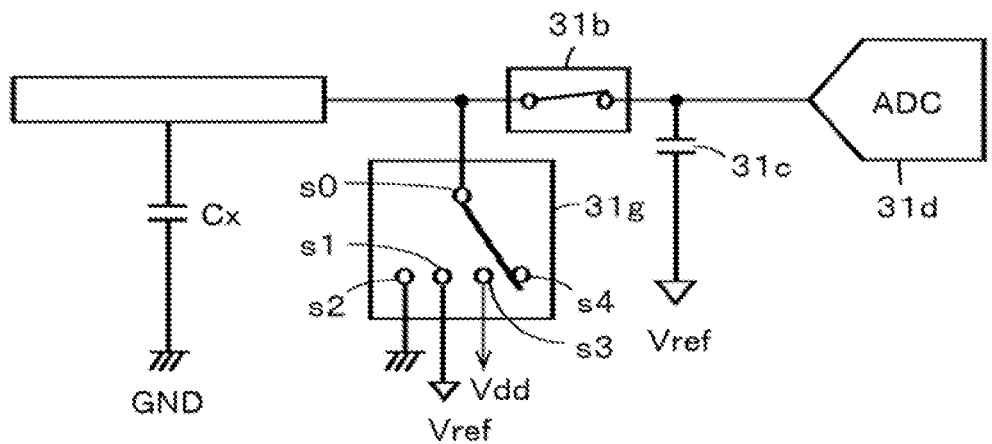

Next, the control circuit 204 switches the switching circuit 31g to the terminal s4, a free end, using the switching control signal SW5 as illustrated in FIG. 14D, and then turns ON (closes) the gate circuit 31b using the gate control signal SW2 as illustrated in FIG. 14E. As a result, the capacitor circuit 31c discharges because of the potential difference between the first and second ends of the gate circuit 31b, bringing the first end of the capacitor circuit 31c to the same voltage as the receiving conductor 11X (step S304). It should be noted that, in consideration of a case in which the capacitor circuit 31c does not complete its desired discharge in a single discharge, the gate circuit 31b may open and close a plurality of times to discharge the capacitor circuit 31c.

Figure 14F:
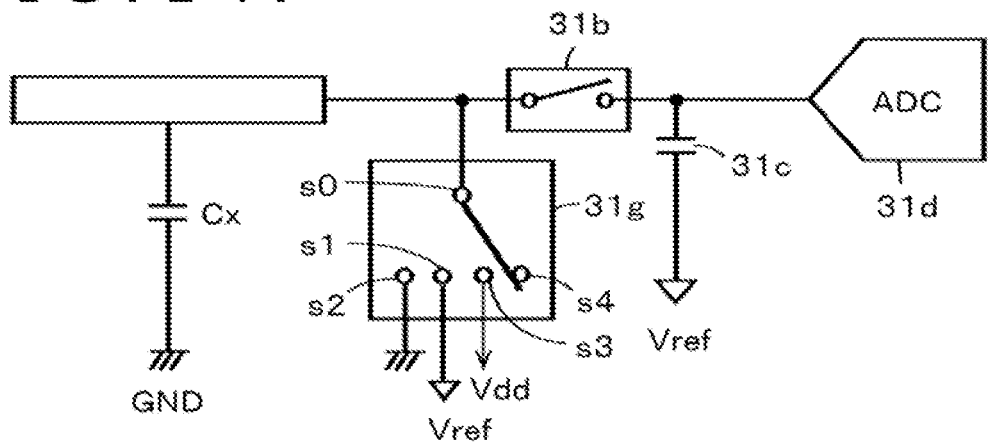

Next, the control circuit 204 turns OFF (opens) the gate circuit 31b using the gate control signal SW2 as illustrated in FIG. 14F (step S305). Then, the control circuit 204 activates the ADC 31d using the activation control signal CT, converts the voltage held by the capacitor circuit 31c to a digital signal D3– using the ADC 31d, and temporarily stores the digital signal D3– (step S306).

Next, following step S306, the control circuit 204 restores the signal processing circuit 31C to the states shown in FIG. 14A using the gate control signal SW2 and the switching control signal SW5. That is, the control circuit 204 turns ON (closes) the gate circuit 31b and switches the switching circuit 31g to the terminal s1 that is set to the reference voltage Vref, thus clamping the receiving conductor 11X to the reference voltage Vref and connecting the first end of the capacitor circuit 31c to the receiving conductor 11X to bring the first end of the capacitor circuit 31c and the receiving conductor 11X to the same voltage (step S307). That is, as a result of the switching control of the gate circuit 31b and the switching circuit 31g by the control circuit 204, the first end of the gate circuit 31b to which the receiving conductor 11X is connected is temporarily set to the reference voltage Vref, with the receiving conductor 11X connected to the capacitor circuit 31c via the gate circuit 31b.

Next, the control circuit 204 turns OFF (opens) the gate circuit 31b using the gate control signal SW2 as illustrated in FIG. 14B, and then switches the switching circuit 31g to the terminal s3 using the switching control signal SW5 as illustrated by a dotted line in FIG. 14C, setting, to the source voltage Vdd different from the reference voltage Vref, the first end of the gate circuit 31b to which the receiving conductor 11X is connected (step S308).

Next, the control circuit 204 switches the switching circuit 31g to the terminal s4, a free end, using the switching control signal SW5 as illustrated in FIG. 14D, and then turns ON (closes) the gate circuit 31b using the gate control signal SW2 as illustrated in FIG. 14E. As a result, the capacitor circuit 31c charges because of the potential difference between the first and second ends of the gate circuit 31b, bringing the first end of the capacitor circuit 31c to the same voltage as the receiving conductor 11X (step S309). It should be noted that, in consideration of a case in which the capacitor circuit 31c does not complete its desired charge in a single charge, the gate circuit 31b may open and close a plurality of times to charge the capacitor circuit 31c.

Next, the control circuit 204 turns OFF (opens) the gate circuit 31b using the gate control signal SW2 as illustrated in FIG. 14F (step S310). Then, the control circuit 204 activates the ADC 31d using the activation control signal CT, converts the voltage held by the capacitor circuit 31c to a digital signal D3+ using the ADC 31d, and temporarily stores the digital signal D3+ (step S311).

Next, following step S311, the control circuit 204 finds the difference between the digital signals D3+ and D3−, thus acquiring the self-capacitance free from offset at twice the level (step S312).

The control circuit 204 generates, based on the measured self-capacitance Cx, a correction signal used to correct the finger touch detection result (output signal from the ADC 31d) obtained from the ADC 31d during the finger touch detection execution period TFm, thus correcting the finger touch detection result (output signal from the ADC 31d) using the correction signal (step S313).

Similarly in the third embodiment, the finger touch detection signal obtained during the finger touch detection execution period TFm is corrected using a correction signal generated to correspond to the measured self-capacitance of each of the receiving conductors. This makes it possible to prevent a change in finger touch detection sensitivity even in the event of an increase in the self-capacitance of the receiving conductor touched by a finger.

Other Embodiments and Modification Examples

Figure 16A:
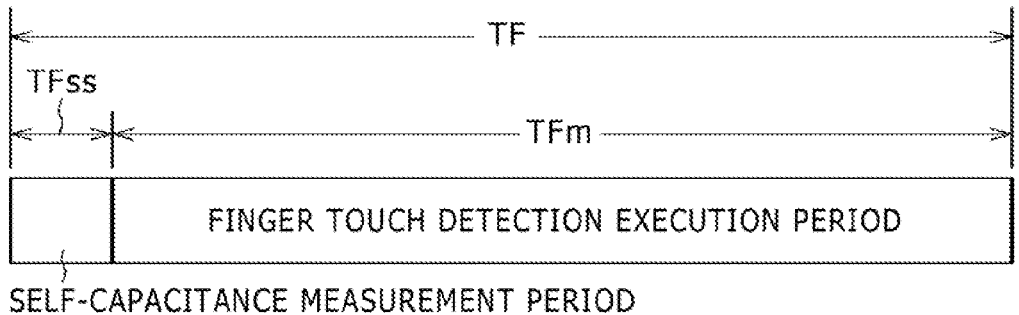
FIGS. 16A to 16D are diagrams for describing a position detector according to another embodiment of the present disclosure.
Figure 16B:
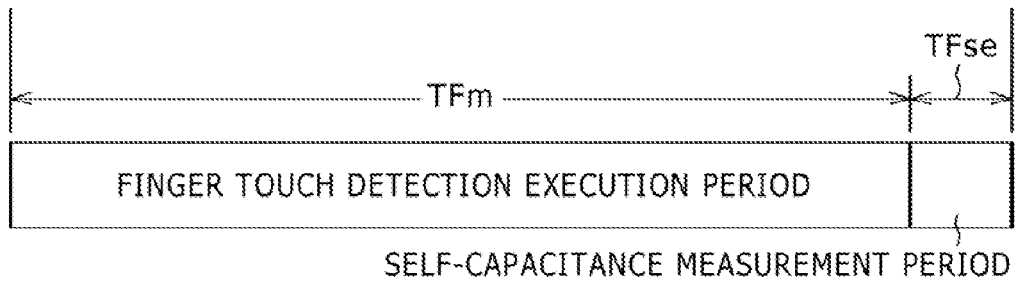

It should be noted that although the self-capacitance measurement periods TFss and TFse are provided immediately before and immediately after the finger touch detection execution period TFm in the above embodiments, one of the self-capacitance measurement periods TFss and TFse may be provided either immediately before or immediately after the finger touch detection execution period TFm as illustrated in FIGS. 16A and 16B.

In this case, the signal generated to correspond to the self-capacitance measured during the self-capacitance measurement period TFss immediately before the finger touch detection execution period TFm illustrated in FIG. 16A can be used as a correction signal of the finger touch detection result obtained during the finger touch detection execution period TFm immediately thereafter. On the other hand, the signal generated to correspond to the self-capacitance measured during the self-capacitance measurement period TFse immediately after the finger touch detection execution period TFm illustrated in FIG. 16B can be used not only as a correction signal of the finger touch detection result obtained during the finger touch detection execution period TFm immediately therebefore but also as a correction signal of the finger touch detection result obtained during the finger touch detection execution period TFm thereafter.

Figure 16C:
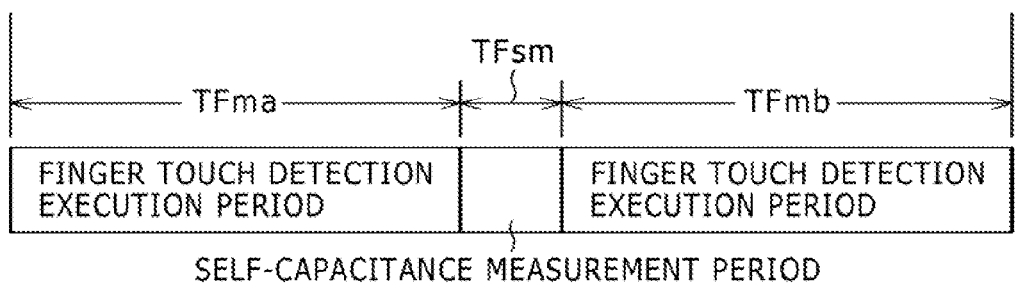

Alternatively, a self-capacitance measurement period TFsm may be provided in the middle of the finger touch detection execution period TFm as illustrated in FIG. 16C. In this case, the finger touch detection execution period TFm is divided into a period TFma previous to the self-capacitance measurement period TFsm and the period TFma subsequent to the self-capacitance measurement period TFsm.

Figure 16D:
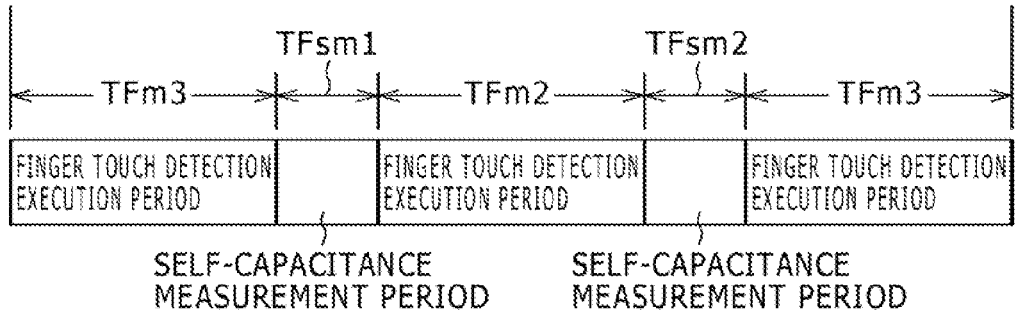

Still alternatively, a plurality of self-capacitance measurement periods TFsm1 and TFsm2 may be provided in the middle of the finger touch detection execution period TFm as illustrated in FIG. 16D. In this case, the digital value of the ADC 31d is corrected using the signal corresponding to the mean value of the self-capacitances measured during the self-capacitance measurement periods TFsm1 and TFsm2. It should be noted that the finger touch detection execution period TFm is divided into periods TFm1, TFm2, and TFm3.

In the above embodiments, the voltage is reduced from the reference voltage Vref to the ground potential GND to obtain a voltage change ($\Delta V-$), and the voltage is increased from the reference voltage Vref to the source voltage Vdd to obtain a voltage change ($\Delta V+$) during the self-capacitance measurement periods TFss and TFse, after which the difference between the two voltage changes is found to eliminate the offset of the ADC 31d.

During the self-capacitance measurement periods TFss and TFse, however, only one of the two processes, namely, reducing the voltage from the reference voltage Vref to the ground potential GND to obtain the voltage change ($\Delta V-$) and increasing the voltage from the reference voltage Vref to the source voltage Vdd to obtain the voltage change ($\Delta V+$), may be performed. In this case, it is not necessary for the voltage change $\Delta V$ to be relative to the reference voltage Vref. The voltage change $\Delta V$ may naturally take place from an arbitrary given voltage to an arbitrary voltage different from the given voltage. For example, the voltage may change from the ground potential GND to the source voltage Vdd or conversely from the source voltage Vdd to the ground potential GND.

Further, in order to eliminate the offset of the ADC 31d by obtaining the voltage changes ($\Delta V-$) and ($\Delta V+$) and finding the difference between the two voltage changes, the voltage change $\Delta V$ is relative to the reference voltage Vref=(Vdd−GND)/2, and the voltage is switched between the ground potential GND and the source voltage Vdd in the above embodiments. However, it is not necessary to use the reference voltage Vref as a reference voltage for obtaining the voltage changes ($\Delta V-$) and ($\Delta V+$). An arbitrary voltage may be used as a reference voltage. Further, the variation in voltage relative to the reference voltage to obtain the voltage change ($\Delta V-$) and that to obtain the voltage change ($\Delta V+$) may be arbitrary voltages so long as the two voltages are equal in absolute value.

Further, in order to obtain the voltage changes ($\Delta V-$) and ($\Delta V+$), either the potential of the receiving conductor 11X or the voltage at the first end of the capacitor circuit 31c, which is the connection point between the capacitor circuit 31c and the ADC, is switched. However, both the voltage of the receiving conductor 11X and the voltage at the first end of the capacitor circuit 31c may be switched in synchronism.

Still further, if two self-capacitance measurement periods are provided during the finger touch detection period TF, the voltage may be reduced from the reference voltage Vref to the ground potential GND to obtain the voltage change ($\Delta V-$) during one of the self-capacitance measurement periods, and the voltage may be increased from the reference voltage Vref to the source voltage Vdd to obtain the voltage change ($\Delta V+$) during the other self-capacitance measurement period, followed by calculation of (($\Delta V-$)−($\Delta V+$)) to eliminate the offset of the ADC 31d.

It should be noted that, in the first and second embodiments, the self-capacitance is measured by fixing the voltage of the receiving conductor 11X to a given voltage and switching the voltage of the capacitor circuit adapted to hold a voltage. Further, in the third embodiment, the self-capacitance is measured by fixing the voltage of the capacitor circuit adapted to hold a voltage and switching the voltage of the receiving conductor 11X. However, the self-capacitance can be measured by switching both the voltage of the receiving conductor 11X and the voltage of the capacitor circuit adapted to hold a voltage.

The above embodiments prevent a change in finger touch detection sensitivity based on the measurement result of the self-capacitance measured only during the finger touch detection period TF. However, a self-capacitance measurement period may be similarly provided during the pen pointing detection period TP so that the detection result of pointing with an active capacitive pen can be corrected based on the signal generated to correspond to the measured self-capacitance. During the pen pointing detection with the active capacitive pen, as the user's hand holding the active capacitive pen 6 or the user's other hand approaches or touches the sensor section 100, the self-capacitances of the receiving conductors 11X of the sensor section 100 may increase. Even in this case, however, it is possible to generate a signal corresponding to the pen pointing detection result as is done during the finger touch detection period TF.

It should be noted that, in the above embodiments, the pointer to be detected by the finger touch detection circuit 202 of the control device section 200 of the position detector based on the change in capacitance is a finger. However, the pointer to be detected is not limited to a finger. It is needless to say that the pointer to be detected may be, for example, a so-called passive capacitive pen housed in an enclosure made of a conductor.

Further, charge may be transferred a plurality of times between the receiving conductor and the capacitor circuit 31c via the gate circuit 31b in response to the voltage change ΔV by turning ON and OFF the switching circuit 31b a plurality of times, as described above.

Still further, the operation adapted to detect the conversion values D1+, D2+, D3+, D1−, D2−, and D3− may be performed repeatedly a plurality of times so as to generate a correction signal for the ADC 31d from the results of the plurality of detection operations. For example, a correction signal may be generated from the mean value of the results of the plurality of detection operations.

Still further, in the above embodiments, description has been given of a position detection sensor having a plurality of transmitting conductors and a plurality of receiving conductors arranged to intersect each other. However, the present disclosure is also applicable to a position detection sensor having a plurality of so-called rectangular conductors arranged to be parallel to each other in one direction. In this case, it is needless to say that the pointer may be also a passive or active capacitive pen.

It should be noted that although, in the above embodiments, the digital signal converted by the ADC 31d is corrected to correct the detection signal of the position pointed to by the pointer using the signal generated to correspond to the self-capacitance of the receiving conductor of the position detection sensor, it is naturally possible to correct the detection signal by correcting the analog signal supplied to the ADC 31d.

While the term "self-capacitance measurement" has been used in the description of the present disclosure above, it is needless to say that the term "self-capacitance measurement" does not refer to the process intended to find the self-capacitance Cx of the receiving conductor itself.

It is to be noted that the embodiment of the present disclosure is not limited to the foregoing embodiments, and that various changes can be made without departing from the spirit of the present disclosure.

What is claimed is:

1. A signal processing circuit connected to one of a plurality of conductors of a position detection sensor having a self-capacitance, the signal processing circuit including a capacitor circuit and configured to detect a change in capacitance between the conductor and a pointer as a change in voltage in the capacitor circuit, the signal processing circuit further comprising:
   a gate circuit which, in operation, controls a connection between the capacitor circuit and the conductor;
   a voltage supply control circuit which, in cooperative operation with the gate circuit, temporarily sets, to a defined voltage level, a first end of the gate circuit to which the conductor is connected, and sets a defined potential difference between the first end of the gate circuit and a second end of the gate circuit to which the capacitor circuit is connected, and
   an analog-digital conversion circuit which, in operation, converts a voltage signal form the capacitor circuit to a digital signal, wherein
   a first voltage signal produced in the capacitor circuit during detection of a position pointed to by the pointer and a second voltage signal, which is produced in the capacitor circuit due to the defined potential difference between the first and second ends of the gate circuit, are generated in a time divided manner and supplied to the analog-digital conversion circuit, and
   first and second digital signals that correspond respectively to the first and second voltage signals are generated, and the first digital signal is corrected using the second digital signal corresponding to the self-capacitance.

2. The signal processing circuit of claim 1, wherein the potential difference is produced, when the conductor is connected to the capacitor circuit via the gate circuit, by temporarily setting the first end of the gate circuit to the defined voltage using the voltage supply control circuit, and then setting, to a voltage different from the defined voltage, a second end of the capacitor circuit different from a first end of the capacitor circuit connected to the second end of the gate circuit, using the voltage supply control circuit.

3. The signal processing circuit of claim 2, wherein when the first end of the gate circuit is set to the defined voltage, the voltage supply control circuit sets the second end of the capacitor circuit to a second voltage different from a first voltage, to which the second end of the capacitor circuit is initially set.

4. The signal processing circuit of claim 2 being driven by a single source voltage, wherein
   the defined voltage supplied to the first end of the gate circuit by the voltage supply control circuit is the median between the source voltage and a ground potential.

5. The signal processing circuit of claim 2 being driven by first and second source voltages, wherein
   the defined voltage supplied to the first end of the gate circuit by the voltage supply control circuit is the median between the first and second source voltages.

6. The signal processing circuit of claim 1, wherein the potential difference is produced, when the conductor is disconnected from the capacitor circuit via the gate circuit, by temporarily setting the first end of the gate circuit to the defined voltage and setting the second end of the gate circuit to a voltage different from the defined voltage using the voltage supply control circuit, and then connecting the conductor and the capacitor circuit via the gate circuit.

7. The signal processing circuit of claim 1, wherein the potential difference is produced, when the conductor is connected to the capacitor circuit via the gate circuit, by temporarily setting the first end of the gate circuit to the defined voltage using the voltage supply control circuit, and then disconnecting the conductor from the capacitor circuit using the gate circuit to temporarily set the first end of the gate circuit to a voltage different from the defined voltage, and connecting the conductor to the capacitor circuit via the gate circuit after setting the first end of the gate circuit to the different voltage.

8. The signal processing circuit of claim 1, wherein
after a first signal is generated that corresponds to the self-capacitance, a second signal is generated that corresponds to the self-capacitance by setting, between the first and second ends of the gate circuit, a potential difference having a reversed polarity relative to the defined potential difference, and
a signal is generated that corresponds to the self-capacitance based on a difference signal between the first and second signals.

9. The signal processing circuit of claim 1, wherein the voltage supply control circuit comprises one or more switching circuits.

10. A position detector comprising:
a position detection sensor having a plurality of conductors arranged therein and having a self-capacitance;
a signal processing circuit connected to at least one of the plurality of conductors of the position detection sensor having the self-capacitance, the signal processing circuit including a capacitor circuit and configured to detect a change in capacitance between the conductor and a pointer as a change in voltage in the capacitor circuit; and
a position detection circuit which, in operation, detects a position pointed to by the pointer based on a signal output from the signal processing circuit, wherein
(i) the signal processing circuit further includes:
a gate circuit which, in operation, controls a connection between the capacitor circuit and the conductor,
a voltage supply control circuit which, in cooperative operation with the gate circuit, temporarily applies a defined voltage to a first end of the gate circuit to which the conductor is connected and applies a defined potential difference between the first end of the gate circuit and a second end of the gate circuit to which the capacitor circuit is connected, and
an analog-digital conversion circuit which, in operation, converts a voltage signal form the capacitor circuit to a digital signal,
(ii) a first voltage signal produced in the capacitor circuit during detection of a position pointed to by the pointer and a second voltage signal, which is produced in the capacitor circuit due to the defined potential difference between the first and second ends of the gate circuit, are generated in a time divided manner and supplied to the analog-digital conversion circuit, and
(iii) first and second digital signals that correspond respectively to the first and second voltage signals are generated, and the first digital signal is corrected using the second digital signal corresponding to the self-capacitance.

11. The position detector of claim 10, wherein the voltage supply control circuit comprises one or more switching circuits.

12. The position detector of claim 10, wherein the gate circuit is comprised of a switching circuit.

13. An electronic device comprising:
(a) a display device; and
(b) a position detector including:
a position detection sensor having a plurality of conductors arranged therein and having a self-capacitance,
a signal processing circuit connected to at least one of the plurality of conductors of the position detection sensor having the self-capacitance, the signal processing circuit including a capacitor circuit and configured to detect a change in capacitance between the conductor and a pointer as a change in voltage in the capacitor circuit, and
a position detection circuit which, in operation, detects a position pointed to by the pointer based on a signal output from the signal processing circuit, wherein
(i) the signal processing circuit further includes:
a gate circuit which, in operation, controls a connection between the capacitor circuit and the conductor, and
a voltage supply control circuit which, in cooperative operation with the gate circuit, temporarily applies a defined voltage to a first end of the gate circuit to which the conductor is connected and applies a defined potential difference between the first end of the gate circuit and a second end of the gate circuit to which the capacitor circuit is connected, and
an analog-digital conversion circuit which, in operation, converts a voltage signal form the capacitor circuit to a digital signal,
(ii) a first voltage signal produced in the capacitor circuit during detection of a position pointed to by the pointer and a second voltage signal, which is produced in the capacitor circuit due to the defined potential difference between the first and second ends of the gate circuit, are generated in a time divided manner and supplied to the analog-digital conversion circuit, and
(iii) first and second digital signals that correspond respectively to the first and second voltage signals are generated, and the first digital signal is corrected using the second digital signal corresponding to the self-capacitance;
wherein the position detection sensor is overlaid on a display screen of the display device; and
wherein the display screen of the display device, in operation, displays information based on the position pointed to by the pointer as detected by the position detection circuit of the position detector.

14. The electronic device of claim 13, wherein the voltage supply control circuit comprises one or more switching circuits.

15. A signal processing method for use with one of a plurality of conductors of a position detection sensor having a self-capacitance to detect a change in capacitance between the conductor and a pointer as a change in voltage in a capacitor circuit, the signal processing method comprising:
providing a gate circuit which controls a connection between the capacitor circuit and the conductor;
providing a voltage supply control circuit which, in cooperative operation with the gate circuit, temporarily applies a defined voltage to a first end of the gate circuit to which the conductor is connected and applies a defined potential difference between the first end of the gate circuit and a second end of the gate circuit to which the capacitor circuit is connected, producing a first voltage signal in the capacitor circuit during detection of a position pointed to by the pointer, and a second voltage signal in the capacitor circuit due to the defined potential difference between the first and second ends of the gate circuit, in a time divided manner and supplying the first and second voltage signals to an analog-digital conversion circuit, generating first and second digital signals that correspond respectively to the first and second voltage signals, and correcting the first digital signal using the second digital signal corresponding to the self-capacitance.

16. The signal processing method of claim 15, wherein the potential difference is produced, when the conductor is connected to the capacitor circuit via the gate circuit, by temporarily setting the first end of the gate circuit to the defined voltage using the voltage supply control circuit, and then setting, to a voltage different from the defined voltage, a second end of the capacitor circuit different from a first end of the capacitor circuit connected to the second end of the gate circuit, using the voltage supply control circuit.

17. The signal processing method of claim 15, wherein the potential difference is produced, when the conductor is disconnected from the capacitor circuit via the gate circuit, by temporarily setting the first end of the gate circuit to the defined voltage and setting the second end of the gate circuit to a voltage different from the defined voltage using the voltage supply control circuit, and then connecting the conductor and the capacitor circuit via the gate circuit.

18. The signal processing method of claim 15, wherein the potential difference is produced, when the conductor is connected to the capacitor circuit via the gate circuit, by temporarily setting the first end of the gate circuit to the defined voltage using the voltage supply control circuit, and then disconnecting the conductor from the capacitor circuit using the gate circuit to temporarily set the first end of the gate circuit to a voltage different from the defined voltage, and connecting the conductor to the capacitor circuit via the gate circuit after setting the first end of the gate circuit to the different voltage.

* * * * *